(12) United States Patent
Kariatsumari et al.

(10) Patent No.: US 8,380,398 B2
(45) Date of Patent: Feb. 19, 2013

(54) MOTOR CONTROL UNIT AND MOTOR CONTROL UNIT FOR VEHICLE STEERING APPARATUS

(75) Inventors: Yuji Kariatsumari, Yamatotakada (JP); Hayato Komatsu, Aichi (JP); Shingo Maeda, Kashiwara (JP)

(73) Assignee: Jtekt Corporation, Osaka (JP)

( * ) Notice: Subject to any disclaimer, the term of this patent is extended or adjusted under 35 U.S.C. 154(b) by 329 days.

(21) Appl. No.: 12/659,489

(22) Filed: Mar. 10, 2010

(65) Prior Publication Data

US 2010/0235049 A1   Sep. 16, 2010

(30) Foreign Application Priority Data

Mar. 12, 2009   (JP) ................................. 2009-059853

(51) Int. Cl.
*B62D 6/00* (2006.01)
(52) U.S. Cl. .......................................................... 701/41
(58) Field of Classification Search ...................... 701/41
See application file for complete search history.

(56) References Cited

U.S. PATENT DOCUMENTS

| | | | |
|---|---|---|---|
| 5,398,953 A | | 3/1995 | Shimizu |
| 5,927,430 A * | | 7/1999 | Mukai et al. ................. 180/446 |
| 6,808,043 B2 * | | 10/2004 | Kawada et al. .............. 180/446 |
| 7,076,340 B1 | | 7/2006 | Inazumi et al. |
| 7,383,111 B2 * | | 6/2008 | Takimoto et al. ............... 701/41 |
| 7,546,193 B2 * | | 6/2009 | Oishi et al. ...................... 701/45 |
| 7,894,956 B2 * | | 2/2011 | Kondo et al. ................... 701/41 |
| 8,027,765 B2 * | | 9/2011 | Urababa et al. ................ 701/38 |
| 8,134,326 B2 * | | 3/2012 | Hayashi ........................ 318/599 |
| 2004/0200661 A1 * | | 10/2004 | Sugitani et al. .............. 180/402 |
| 2006/0021822 A1 * | | 2/2006 | Yamamoto ..................... 180/446 |
| 2006/0080016 A1 * | | 4/2006 | Kasahara et al. ............... 701/41 |
| 2006/0125439 A1 | | 6/2006 | Ajima et al. |
| 2007/0039775 A1 * | | 2/2007 | Matsuno et al. .............. 180/446 |
| 2007/0222409 A1 * | | 9/2007 | Kariatsumari et al. ........ 318/807 |
| 2007/0229021 A1 | | 10/2007 | Yoshida et al. |
| 2008/0143286 A1 | | 6/2008 | Egami |
| 2008/0201041 A1 * | | 8/2008 | Jiang .............................. 701/42 |
| 2008/0243341 A1 * | | 10/2008 | Hayama et al. ................. 701/42 |
| 2009/0105907 A1 * | | 4/2009 | Yamaguchi et al. ............ 701/41 |

FOREIGN PATENT DOCUMENTS

EP   1 955 926 A2   8/2008
JP   A-10-243699   9/1998

OTHER PUBLICATIONS

European Search Report dated Jul. 7, 2010 in European Patent Application No. 10 15 6223.9.

* cited by examiner

*Primary Examiner* — James Trammell
*Assistant Examiner* — Truc M Do
(74) *Attorney, Agent, or Firm* — Oliff & Berridge, PLC

(57) ABSTRACT

A steering assist operation is performed, which includes a motor control unit that controls a motor, and the steering assist operation does not require a rotational angle sensor. A current drive unit drives the motor at an axis current value of a rotating coordinate system that rotates in accordance with a control angle, which is calculated by a control angle calculation unit. The control angle calculation unit obtains, at every predetermined calculation cycle, a present value of the control angle by adding an addition angle to an immediately preceding value of the control angle. An addition angle calculation unit calculates the addition angle to be added to the control angle through a proportional-integral control based on a torque deviation from a command torque set by a command torque setting unit.

20 Claims, 13 Drawing Sheets

_US 8,380,398 B2_

MOTOR CONTROL UNIT AND MOTOR CONTROL UNIT FOR VEHICLE STEERING APPARATUS

INCORPORATION BY REFERENCE

The disclosure of Japanese Patent Application No. 2009-059853 filed on Mar. 12, 2009 including the specification, drawings and abstract is incorporated herein by reference in its entirety.

BACKGROUND OF THE INVENTION

1. Field of the Invention

The invention relates to a motor control unit used to drive a brushless motor.

2. Description of the Related Art

A brushless motor may be used as a drive source for, for example, a vehicle steering apparatus. An example of a vehicle steering apparatus is an electric power steering apparatus. A motor control unit that controls driving of a brushless motor is usually configured to control the electric current that is supplied to a motor based on the output from a rotational angle sensor that detects the rotational angle of a rotor. As a rotational angle sensor, a resolver that outputs a sine-wave signal and a cosine-wave signal that correspond to the rotational angle (electrical angle) of a rotor is usually used. However, a resolver is expensive, and needs a large number of wires and a large installation space. Therefore, using a resolver as a rotational angle sensor hinders reduction in cost and size of a unit that includes a brushless motor.

US Patent No. 2007/0229021 A1 describes a sensorless drive method for driving a brushless motor without using a rotational angle sensor. According to the sensorless drive method, the induced voltage that varies depending on the rotational speed of a rotor is estimated in order to estimate the phase of a magnetic pole (electrical angle of the rotor). When the rotor is at a standstill or rotating at a considerably low speed, it is not possible to estimate the induced voltage. Therefore, the phase of the magnetic pole is estimated by another method. More specifically, a sensing signal is input in a stator, and a response of the motor to the sensing signal is detected. Then, the rotational position of the rotor is estimated based on the response of the motor.

SUMMARY OF THE INVENTION

It is an object of the invention to provide a motor control unit that controls a motor according to a new control method that does not require a rotational angle sensor.

An aspect of the invention relates to a motor control unit that is used to control a motor that includes a rotor and a stator that faces the rotor. A current drive unit drives the motor at an axis current value of a rotating coordinate system that rotates in accordance with a control angle that is a rotational angle used in a control. A control angle calculation unit obtains, at every predetermined calculation cycle, a present value of the control angle by adding an addition angle to an immediately preceding value of the control angle. A torque detection unit detects a torque that is other than a motor torque and that is applied to a drive target that is driven by the motor. A command torque setting unit sets a command torque that is to be applied to the drive target. An addition angle calculation unit calculates the addition angle that is to be added to the control angle through a proportional-integral control based on a torque deviation of the torque that is detected by the torque detection unit from the command torque that is set by the command torque setting unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
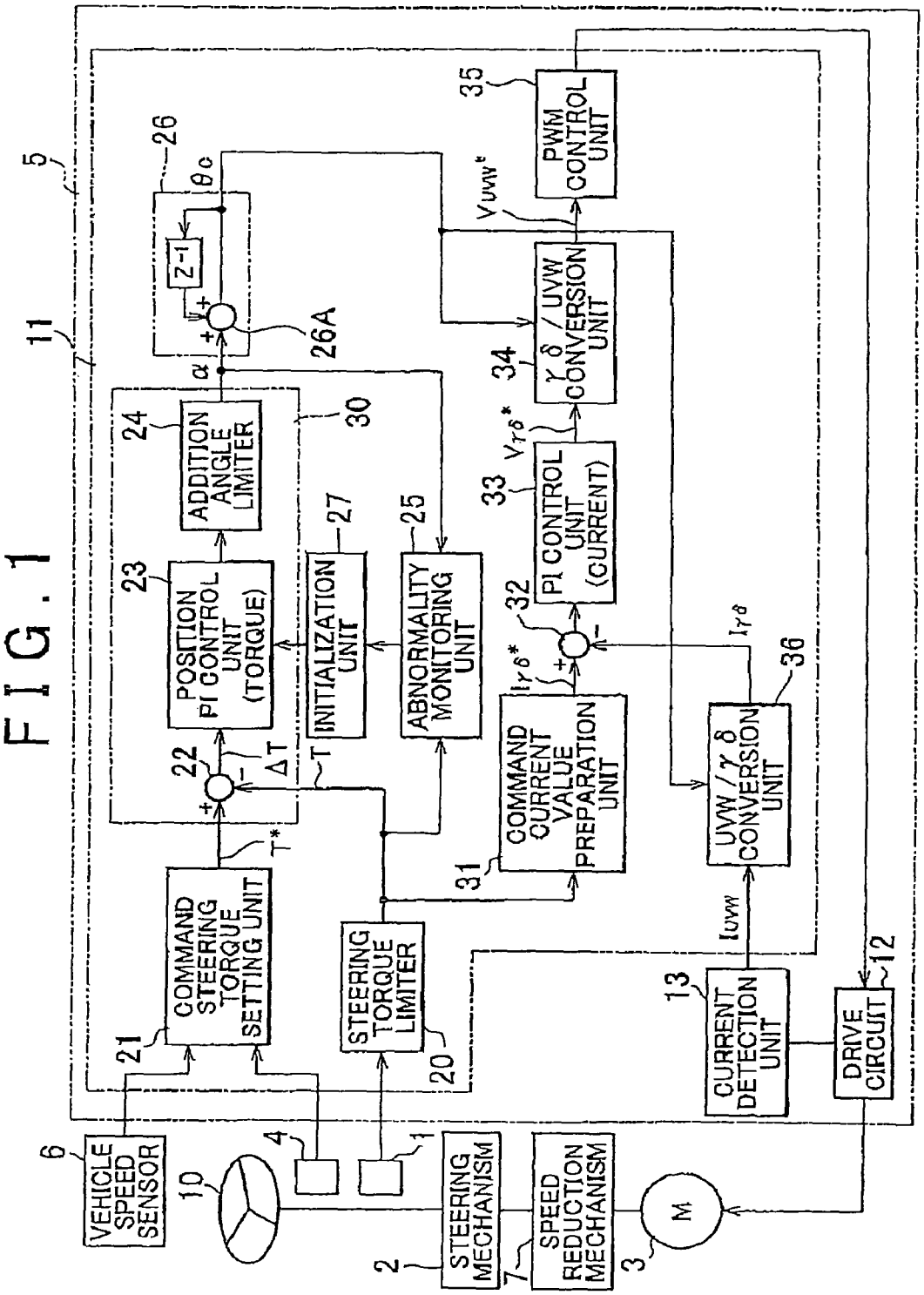
FIG. 1 is a block diagram illustrating the electrical configuration of an electric power steering apparatus that includes a motor control unit according to a first embodiment of the invention.

Hereafter, example embodiments of the invention will be described with reference to the accompanying drawings. FIG. 1 is a block diagram illustrating the electrical configuration of an electric power steering apparatus (an example of a vehicle steering apparatus) that includes a motor control unit according to a first embodiment of the invention. The electric power steering apparatus includes a torque sensor 1 that detects the steering torque T that is applied to a steering wheel 10 that serves as an operation member used to steer a vehicle, a motor 3 (brushless motor) that applies a steering assist force to a steering mechanism 2 of the vehicle via a speed reduction mechanism 7, a steering angle sensor 4 that detects the steering angle that is the rotational angle of the steering wheel 10, a motor control unit 5 that controls driving of the motor 3, and a vehicle speed sensor 6 that detects the speed of the vehicle in which the electric power steering apparatus is mounted.

The motor control unit 5 controls driving of the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed.

Figure 2:
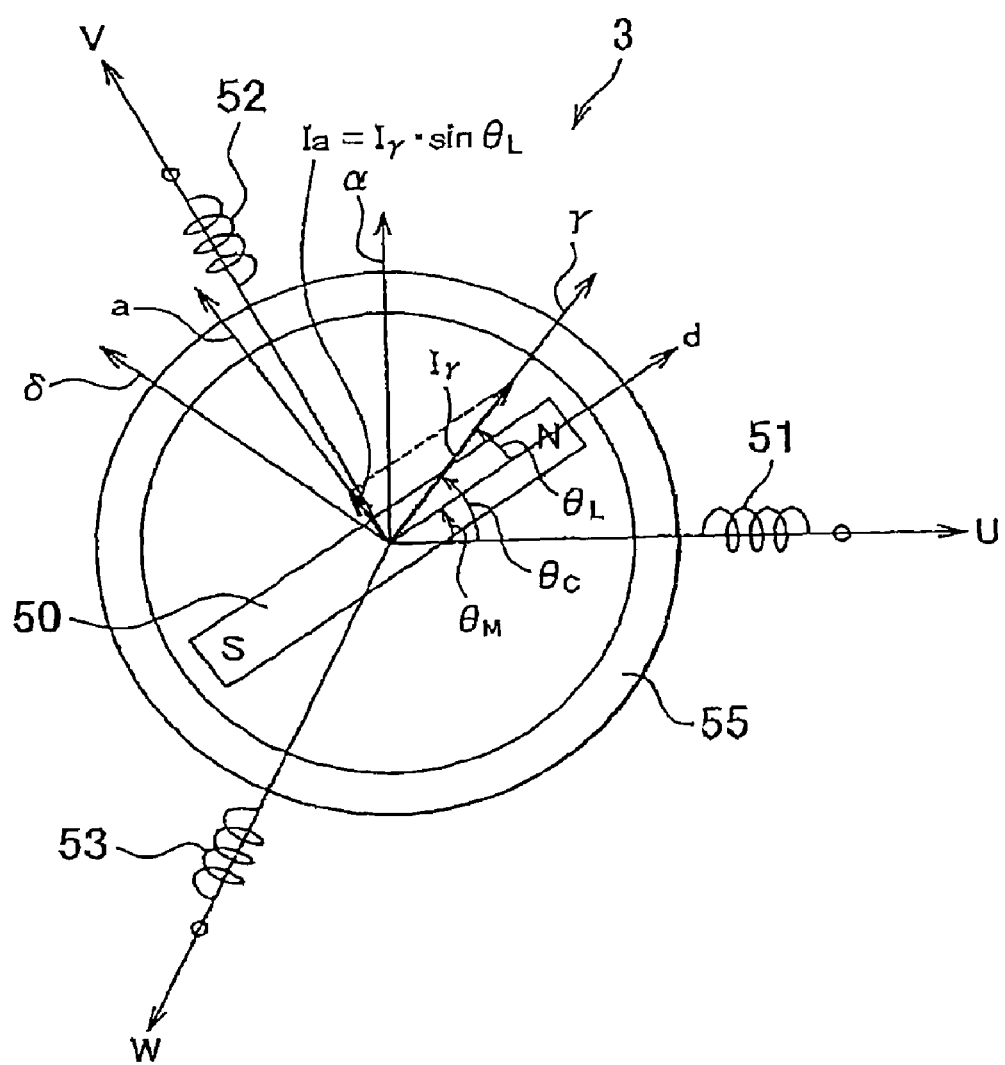
FIG. 2 is a view illustrating the configuration of a motor.

In the first embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) $\theta M$ of the rotor 50 is a rotational angle of the d-axis with respect to the U-axis. The dq coordinate system is an actual rotating coordinate system that rotates in accordance with the rotor angle $\theta M$. With the use of the rotor angle $\theta M$, coordinate conversion may be made between the UVW coordinate system and the dq coordinate system.

In the first embodiment, the control angle $\theta C$ that indicates the rotational angle used in the control is employed. The control angle $\theta C$ is an imaginary rotational angle with respect to the U-axis. An imaginary two-phase rotating coordinate system ($\gamma\delta$ coordinate system: hereafter, referred to as "imaginary rotating coordinate system". Hereafter, the coordinate axis of the imaginary rotating coordinate system will be referred to as "imaginary axis". Also, the axis current value of the imaginary axis will be referred to as "imaginary axis current value"), where the imaginary axis that forms the control angle $\theta C$ with the U-axis is used as the $\gamma$-axis, and the axis that is advanced 90 degrees from the $\gamma$-axis is used as the $\delta$-axis, is defined. When the control angle $\theta C$ is equal to the rotor angle $\theta M$, the $\gamma\delta$ coordinate system, which is the imaginary rotating coordinate system, and the dq coordinate system, which is the actual rotating coordinate system, coincide with each other. That is, the $\gamma$-axis, which is the imaginary axis, coincides with the d-axis, which is the actual axis, and the $\delta$-axis, which is the imaginary axis, coincides with the q-axis, which is the actual axis. The $\gamma\delta$ coordinate system is an imaginary rotating coordinate system that rotates in accordance with the control angle $\theta C$. Coordinate conversion may be made between the UVW coordinate system and the $\gamma\delta$ coordinate system with the use of the control angle $\theta C$.

The load angle $\theta L$ ($=\theta C-\theta M$) is defined based on the difference between the control angle $\theta C$ and the rotor angle $\theta M$.

When the $\gamma$-axis current $I\gamma$ is supplied to the motor 3 based on the control angle $\theta C$, the q-axis component of the $\gamma$-axis current $I\gamma$ (orthogonal projection to the q-axis) is used as the q-axis current Iq that contributes to generation of torque by the rotor 50. That is, the relationship expressed by Equation 1 is established between the $\gamma$-axis current $I\gamma$ and the q-axis current Iq.

$$Iq = I\gamma \times \sin\theta L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current IU, the V-phase current IV and the W-phase current IW that flow through the U-phase stator coil 51, the V-phase stator coil 52, and the W-phase stator coil 53 of the motor 3, respectively, (these phase currents will be collectively referred to as "three-phase detected current IUVW" where appropriate). The U-phase current IU, the V-phase current IV and the W-phase current IW are the current values in the directions of the axes of the UVW coordinate system.

The microcomputer 11 includes a CPU and memories (a ROM, a RAM, etc.), and serves as multiple function processing units by executing predetermined programs. The multiple function processing units include a steering torque limiter 20, a command steering torque setting unit 21, a torque deviation calculation unit 22, a position PI (proportional-integral) control unit 23, an addition angle limiter 24, an abnormality monitoring unit 25, a control angle calculation unit 26, an initialisation unit 27, a command current value preparation unit 31, a current deviation calculation unit 32, a PI control unit 33, a $\gamma\delta$/UVW conversion unit 34, a PWM (Pulse Width Modulation) control unit 35, and a UVW/$\gamma\delta$ conversion unit 36.

Figure 4:
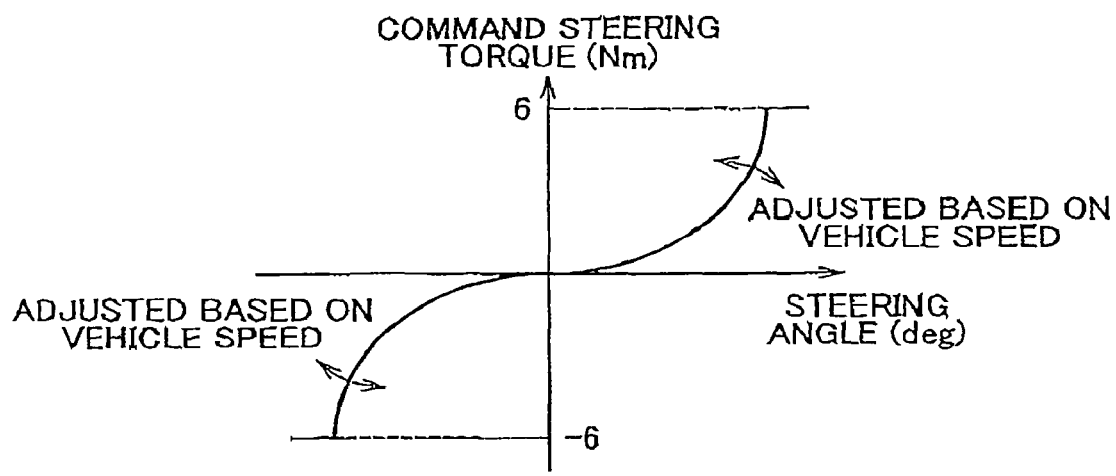
FIG. 4 is a graph showing an example of the characteristic of the command steering torque with respect to the steering angle.

The command steering torque setting unit 21 sets the command steering torque T* based on the steering angle detected by the steering angle sensor 4 and the vehicle speed detected by the vehicle speed sensor 6. For example, as shown in FIG. 4, the command steering torque T* when the steering angle is a positive value (when the steering wheel 10 is operated clockwise) is set to a positive value (torque applied in the clockwise direction), and the command steering torque. T* when the steering angle is a negative value (when the steering wheel 10 is operated counterclockwise) is set to a negative value (torque applied in the counterclockwise direction). The command steering torque T* is set in such a manner that the absolute value of the command steering torque T* increases (non-linearly increases, in the example in FIG. 4) as the absolute value of the steering angle increases. However, the command steering torque T* is set to a value within a range between a predetermined upper limit (positive value (e.g. +6 Nm)) and a predetermined lower limit (negative, value (e.g. −6 Nm)). In addition, the command steering torque T* is set in such a manner that the absolute value of the command steering torque T* decreases as the vehicle speed increases. That is, a vehicle speed-sensitive control is executed.

Figure 5:
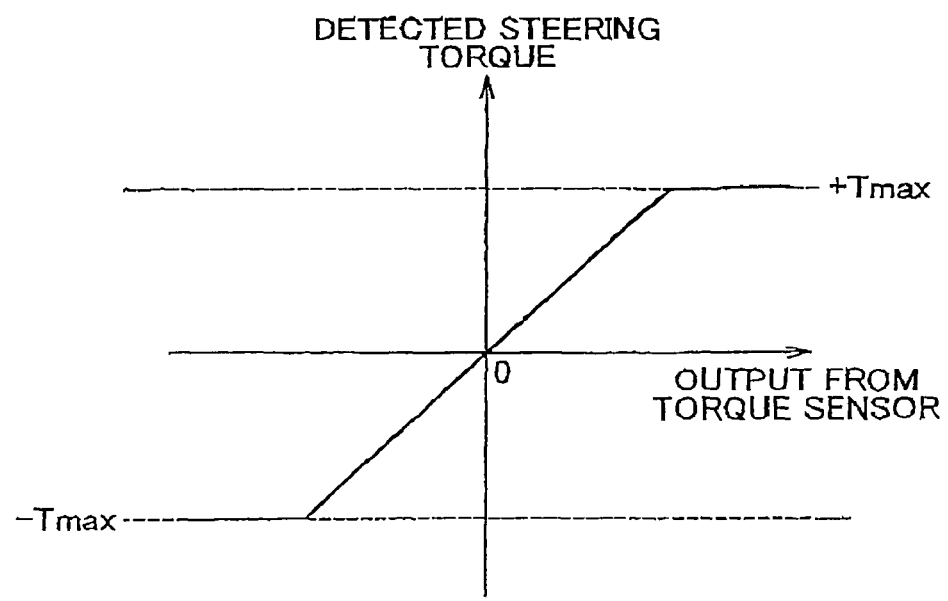
FIG. 5 is a graph for describing the function of a steering torque limiter.

The steering torque limiter 20 limits the output from the torque sensor 1 within a range between a predetermined upper saturation value +Tmax (+Tmax>0 (e.g. +Tmax=7 Nm)) and a predetermined lower saturation value −Tmax (−Tmax<0 (e.g. −Tmax=−7 Nm)). More specifically, as shown in FIG. 5, when the output from the torque sensor 1 is within the range between the upper saturation value +Tmax and the lower saturation value −Tmax, the steering torque limiter 20 outputs the detected steering torque T that is the value output from the torque sensor 1 without limitation. When the detected steering torque T from the torque sensor 1 is equal to or higher than the upper saturation value +Tmax, the steering torque limiter 20 outputs the upper saturation value +Tmax. When the detected steering torque T from the torque sensor 1 is equal to or lower than the lower saturation value −Tmax, the steering torque limiter 20 outputs the lower saturation value −Tmax. The saturation values +Tmax and −Tmax define a stable range (reliable range) of the output signal from the torque sensor 1. That is, in the range where the output from the torque sensor 1 is higher than the upper saturation value +Tmax and the range where the output from the torque sensor 1 is lower than the lower saturation value −Tmax, the output signal from the torque sensor 1 is unstable and does not correspond to the actual steering torque. In other words, the saturation values +Tmax and −Tmax are determined based on the output characteristic of the torque sensor 1.

The torque deviation calculation unit 22 obtains the deviation (torque deviation) ΔT (=T*−T) of the steering torque T that is detected by the torque sensor 1 and then subjected to the limitation process executed by the torque limiter 20 (hereinafter, referred to as "detected steering torque T" so as to be distinguished from the command steering torque T*) from the command steering torque T* that is set by the command steering torque setting unit 21. The position PI control unit 23 executes the position PI calculation on the torque deviation ΔT. That is, the torque deviation calculation unit 22 and the position PI control unit 23 constitute a torque feedback control unit that brings the detected steering torque T to the command steering torque T*. The position PI control unit 23 calculates the addition angle α for the control angle θC by executing the position PI calculation on the torque deviation ΔT. Therefore, the torque feedback control unit constitutes, together with the addition angle limiter 24 described below, an addition angle calculation unit 30 that calculates the addition angle α that should be added to the control angle θC.

The addition angle limiter 24 is an addition angle limiting unit that imposes limits on the addition angle α obtained by the position PI control unit 23. More specifically, the addition angle limiter 24 limits the addition angle α to a value within a range between a predetermined upper limit UL (positive value) and a predetermined lower limit LL (negative value). The upper limit UL and the lower limit LL are determined based on a predetermined limit ωmax (ωmax>0: e.g. ωmax=45 degrees). The predetermined limit ωmax is determined based on, for example, the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 2. The number of pole pairs is the number of magnetic pole pairs (pair of north pole and south pole) of the rotor 50.

Maximum rotor angular speed=maximum steering angular speed×speed reduction ratio×number of pole pairs     Equation 2

The maximum value of the amount of change in the electrical angle of the rotor 50 between the calculations (in the calculation cycle) of the control angle θC is expressed by the value obtained by multiplying the maximum rotor angular speed by the calculation cycle, as indicated by Equation 3.

Maximum value of amount of change in rotor angle=maximum rotor angular speed×calculation cycle=maximum steering angular speed×speed reduction ratio×number of pole pairs×calculation cycle     Equation 3

This maximum value of the amount of change in the rotor angle is the maximum amount of change in the control angle θC that is permitted within one calculation cycle. Therefore, the maximum value of the amount of change in the rotor angle may be used as the limit ωmax. With the use of the limit ωmax, the upper limit UL and the lower limit LL for the addition angle α are expressed by Equation 4 and Equation 5, respectively.

$UL = +\omega max$     Equation 4

$LL = -\omega max$     Equation 5

The addition angle α obtained after the above-described limitation process executed by the addition angle limiter 24 is added to the immediately preceding value θC(n−1) (n is the number of the present calculation cycle) of the control angle θC by an addition unit 26A of the control angle calculation unit 26 ("Z−1" in the drawings indicates the immediately preceding value indicated by a signal). Note that, the initial value of the control angle θC is a predetermined value (e.g. 0).

The control angle calculation unit 26 includes the addition unit 26A that adds the addition angle α provided from the addition angle limiter 24 to the immediately preceding value θC(n−1) of the control angle θC. That is, the control angle calculation unit 26 calculates the control angle θC at each predetermined calculation cycle. The control angle calculation unit 26 uses the control angle θC in the immediately preceding calculation cycle as the immediately preceding value θC(n−1), and obtains the present value θC(n) that is the control angle θC in the present calculation cycle based on the immediately preceding value θC(n−1).

The abnormality monitoring unit 25 monitors whether the addition angle α is abnormal. If the addition angle α is abnormal, the abnormality monitoring unit 25 provides the initialization unit 27 with this information. For example, the abnormality monitoring unit 25 compares the absolute value of the addition angle α obtained by the position PI control unit 23 with the threshold αth, and determines whether the state where the absolute value of the addition angle α is equal to or larger than the threshold αth (|α|≥αth) has continued for a predetermined number of calculation cycles. If an affirmative determination is made, the abnormality monitoring unit 25 determines that the addition angle α is abnormal. On the other hand, if a negative determination is made, the abnormality monitoring unit 25 determines that the addition angle α is a normal value.

The threshold αth may be a value that is equal to the limit ωmax. In this case, the predetermined number of calculation cycles may be a value that corresponds to a time period equal to or longer than the assumable value of the longest time period in which a steering operation is continuously performed at the maximum steering angular speed. Thus, it is determined that an abnormality has occurred, when limits are continuously imposed on the control angle θC by the addition angle limiter 24 for a time period that is longer than the assumable longest time period in which a steering operation is continuously performed at the maximum steering angular speed.

The abnormality monitoring unit 25 may be configured to monitor the time period (the number of calculation cycles) in which limits are continuously imposed on the addition angle α by the addition angle limiter 24. That is, it is determined that the addition angle α is abnormal, when limits are continuously imposed on the addition angle α by the addition angle limiter 24 for a time period that is equal to or longer than the time period corresponding to the predetermined number of calculation cycles.

The abnormality monitoring unit 25 also monitors whether the detected steering torque T is equal to the saturation value +Tmax or the saturation value −Tmax, that is, whether the detected steering torque T is saturated. When the detected steering torque T is saturated, the abnormality monitoring unit 25 determines that an abnormality has occurred in the control, and provides the initialization unit 27 with this information.

For example, when the value output from the torque sensor 1 becomes equal to or higher than the saturation value +Tmax or becomes equal to or lower than the saturation value −Tmax, the steering torque limiter 20 may provide the abnormality monitoring unit 25 with this information. Based on this information, the abnormality monitoring unit 25 may determine whether the detected steering torque T is saturated. That is, the abnormality monitoring unit 25 may determine whether the detected steering torque T is saturated based on the operation state of the steering torque limiter 20. As a matter of course, the abnormality monitoring unit 25 may monitor the post-limitation detected steering torque T prepared by the steering torque limiter 20, or may monitor the pre-limitation detected steering torque T that has not undergone limitation process executed by the steering torque limiter 20. The abnormality monitoring unit 25 may compare the pre-limitation detected steering torque T or the post-limitation detected steering torque T with a value that is slightly lower than the upper limit saturation value +Tmax and a value that is slightly higher than the lower limit saturation value −Tmax. In this case, the abnormality monitoring unit 25 may determine that the detected steering torque T is saturated when the detected steering torque T is equal to or higher than the upper limit threshold or equal to or lower than the lower limit threshold.

The initialization unit 27 initializes the integral term of the position PI control unit 23 upon reception of the information that an abnormality has occurred in the control (more specifically, the addition angle α is abnormal or the detected steering torque T is saturated) from the abnormality monitoring unit 25. In this case, "initialization" signifies resetting the integral term to 0. Thus, the state where the addition angle α is continuously subjected to the limitation process executed by the addition angle limiter 24 promptly ends, and the control is resumed. Therefore, it is possible to more promptly bring the control angle θC to the appropriate value.

The command current value preparation unit 31 prepares, as command current values, values of electric currents that should be supplied to the coordinate axes (imaginary axes) of the γδ coordinate system, which is the imaginary rotating coordinate system that corresponds to the control angle θC that is a rotational angle used in the control. More specifically, the command current value preparation unit 31 prepares the γ-axis command current value Iγ* and the δ-axis command current value Iδ* (hereinafter, these values will be collectively referred to as "two-phase command current value Iγδ*" where appropriate). The command current value preparation unit 31 sets the γ-axis command current value Iγ* to a significant value, and sets the δ-axis command current value Iδ* to 0. More specifically, the command current value preparation unit 31 sets the γ-axis command current value Iγ* based on the detected steering torque T that is detected by the torque sensor 1.

Figure 6:
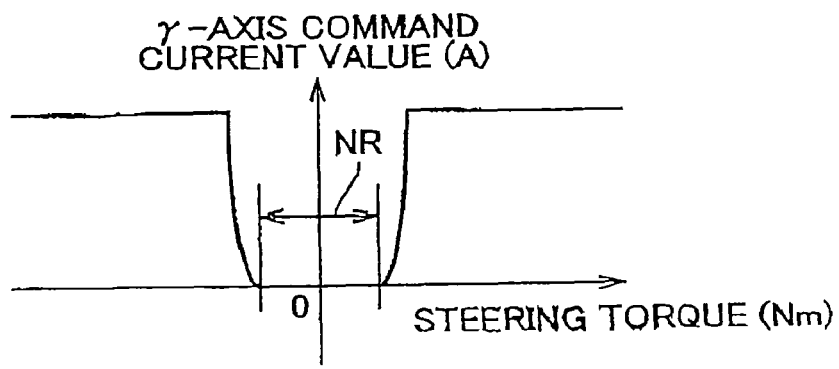
FIG. 6 is a graph showing an example of a manner of setting the γ-axis command current value.

FIG. 6 shows an example of a manner of setting the γ-axis command current value Iγ* with respect to the detected steering torque T. The dead band NR is set in a region near the point at which the detected steering torque T is 0. The γ-axis command current value Iγ* rises sharply in the region outside the dead band NR, and is maintained substantially constant in the region where the torque is at or higher than a predetermined value. Thus, when the driver does not operate the steering wheel 10, electric power supply to the motor 3 is stopped to suppress unnecessary electric power consumption.

The current deviation calculation unit 32 calculates the deviation Iγ*−Iγ of the γ-axis detected current Iγ from the γ-axis command current value Iγ* prepared by the command current value preparation unit 31 and the deviation Iδ*−Iδ of the δ-axis detected current Iδ from the δ-axis command current value Iδ*(=0) prepared by the command current value preparation unit 31. The γ-axis detected current Iγ and the δ-axis detected current Iδ are provided from the UVW/γδ conversion unit 36 to the deviation calculation unit 32.

The UVW/γδ conversion unit 36 converts the three-phase detected current IUVW (U-phase detected current IU, V-phase detected current IV, and the W-phase detected current IW) of the UVW coordinate system, which is detected by the current detection unit 13, into the two-phase detected currents Iγ and Iδ of the γδ coordinate system (hereinafter, these phase currents will be collectively referred to as "two-phase detected current Iγδ" where appropriate). These two-phase detected currents Iγ and Iδ are provided to the current deviation calculation unit 32. The control angle θC calculated by the control angle calculation unit 26 is used for the coordinate conversion that is executed by the UVW/γδ conversion unit 36.

The PI control unit 33 executes the PI calculation on the current deviation calculated by the current deviation calculation unit 32 to prepare the two-phase command voltage Vγδ* (the γ-axis command voltage Vγ* and the δ-axis command voltage Vδ*) that should be applied to the motor 3. The two-phase command voltage Vγδ* is provided to the γδ/UVW conversion unit 34.

The γδ/UVW conversion unit 34 executes the coordinate conversion calculation on the two-phase command voltage Vγδ* to prepare the three-phase command voltage VUVW*. The three-phase command voltage VUVW* is formed of the U-phase command voltage VU*, the V-phase command voltage VV* and the W-phase command voltage VW*. The three-phase command voltage VUVW* is provided to the PWM control unit 35. The control angle θC calculated by the control angle calculation unit 26 is used for the coordinate conversion that is executed by the UVW/γδ conversion unit 36.

The PWM control unit 35 prepares the U-phase PWM control signal, the V-phase PWM control signal and the W-phase PWM control signal having duty ratios that correspond to the U-phase command voltage VU*, the V-phase command voltage VV* and the W-phase command voltage VW*, respectively, and provides the control signals to the drive circuit 12.

The drive circuit 12 is formed of an inverter circuit having three phases that correspond to the U-phase, the V-phase and the W-phase. The power elements that constitute the inverter circuit are controlled based on the PWM control signals provided from the PWM control unit 35, and therefore the voltages that correspond to the three-phase command voltage VUVW* are applied to the U-phase stator coil 51, the V-phase stator coil 52 and the W-phase stator coil 53 of the motor 3.

The current deviation calculation unit 32 and the PI control unit 33 constitute a current feedback control unit. The current feedback control unit controls the electric current that is supplied to the motor 3 in such a manner that the electric current that is supplied to the motor 3 approaches the two-phase command current value $I\gamma\delta^*$ that is set by the command current value preparation unit 31.

Figure 3:
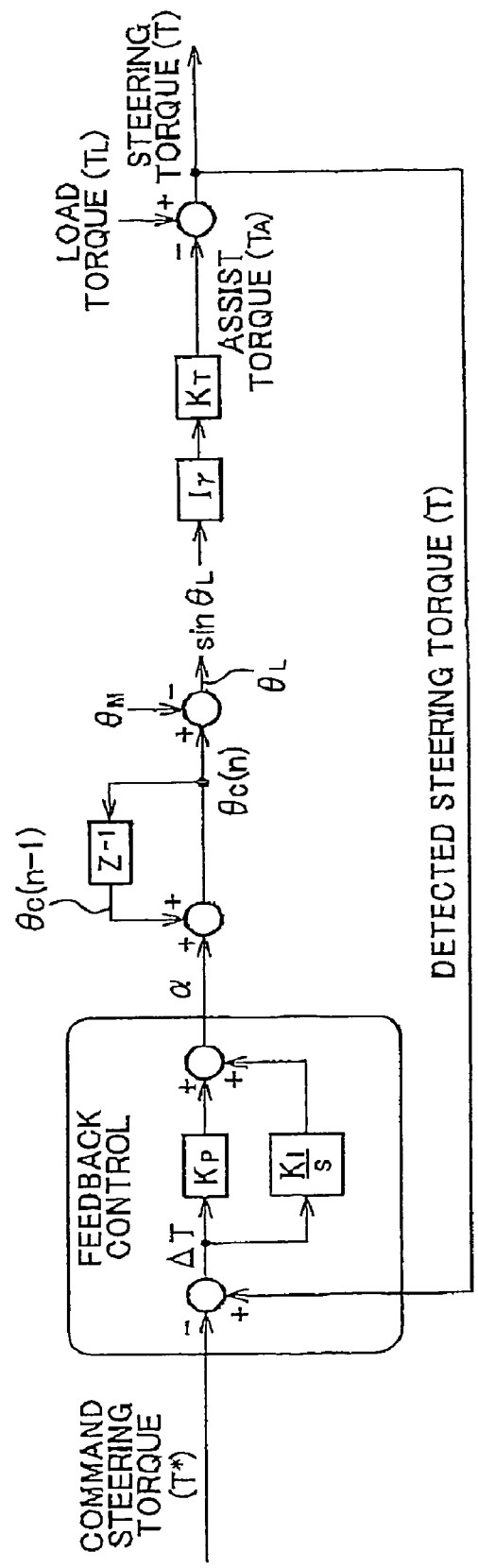
FIG. 3 is a control block diagram of the electric power steering apparatus.

FIG. 3 is a control block diagram of the electric power steering apparatus. Note that the function of the addition angle limiter 24 is omitted to simplify the explanation.

Through the PI control (KP is a proportionality coefficient, KI is an integration coefficient, and l/s is an integration operator) on the deviation (torque deviation) $\Delta T$ of the detected steering torque T from the command steering torque $T^*$, the addition angle $\alpha$ is prepared. The present value $\theta C(n)$ ($\theta C(n)=\theta C(n-1)+\alpha$) of the control angle $\theta C$ is obtained by adding the addition angle $\alpha$ to the immediately preceding value $\theta C(n-1)$ of the control angle $\theta C$. At this time, the deviation of the actual rotor angle $\theta M$ of the rotor 50 from the control angle $\theta C$ is used as the load angle $\theta L$ ($\theta L=\theta C-\theta M$).

Therefore, if the $\gamma$-axis current $I\gamma$ is supplied to the $\gamma$-axis (imaginary axis) in the $\gamma\delta$ coordinate system (imaginary rotating coordinate system), which rotates in accordance with the control angle $\theta C$, based on the $\gamma$-axis command current value $I\gamma^*$, the q-axis current Iq is equal to $I\gamma \sin \theta L$ (Iq=$I\gamma \sin \theta L$). The q-axis current Iq contributes to generation of torque by the rotor 50. That is, the value obtained by multiplying the q-axis current Iq (=$I\gamma \sin \theta L$) by the torque constant KT of the motor 3 is transmitted to the steering mechanism 2 via the speed reduction mechanism 7 as the assist torque TA (=KT×$I\gamma$ sin $\theta L$). The value obtained by subtracting the assist torque TA from the load torque TL from the steering mechanism 2 is the steering torque T that should be applied by the driver to the steering wheel 10. When the steering torque T is fed back, a system is operated in such a manner that the steering torque T is brought to the command steering torque $T^*$. That is, the addition angle $\alpha$ is obtained and the control angle $\theta C$ is controlled based on the addition angle $\alpha$ so that the detected steering torque T coincides with the command steering torque T.

The control angle $\theta C$ is updated with the use of the addition angle $\alpha$ that is obtained based on the deviation $\Delta T$ of the detected steering torque T from the command steering torque $T^*$ while an electric current is supplied to the $\gamma$-axis that is the imaginary axis used in the control. Thus, the load angle $\theta L$ changes and therefore, the torque that corresponds to the load angle $\theta L$ is generated by the motor 3. Therefore, the torque that corresponds to the command steering torque $T^*$ set based on the steering angle and the vehicle speed is generated by the motor 3. Accordingly, an appropriate steering assist force that corresponds to the steering angle and the vehicle speed is applied to the steering mechanism 2. That is, a steering assist control is executed in such a manner that the steering torque increases as the absolute value of the steering angle increases and the steering torque decreases as the vehicle speed increases.

Therefore, there is provided the electric power steering apparatus in which an appropriate steering assist operation is executed by appropriately controlling the motor 3 without using a rotational angle sensor. Thus, the configuration is simplified and cost is reduced.

Figure 7:
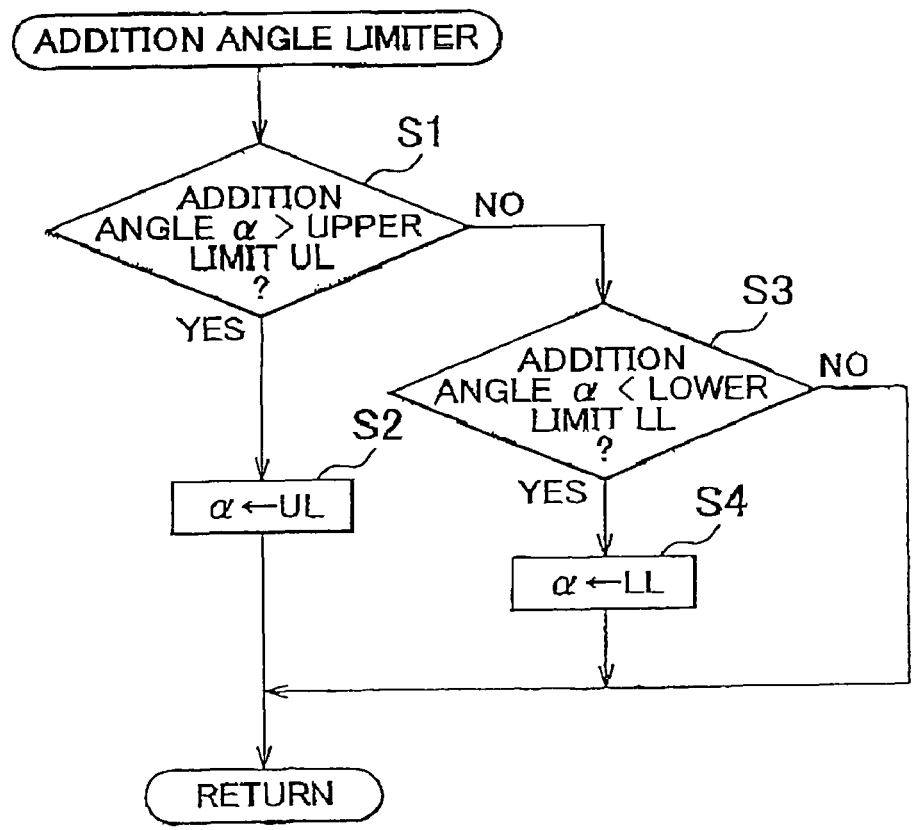
FIG. 7 is a flowchart for describing the function of an addition angle limiter.

FIG. 7 is a flowchart for describing the function of the addition angle limiter 24. The addition angle limiter 24 compares the addition angle $\alpha$ obtained by the position PI control unit 23 with the upper limit UL (step (hereinafter, referred to as "S") 1). When the addition angle $\alpha$ is larger than the upper limit UL ("YES" in S1), the upper limit UL is substituted for the addition angle $\alpha$ (S2). Thus, the upper limit UL (=$\omega$max) is added to the control angle $\theta C$.

When the addition angle $\alpha$ obtained by the position PI control unit 23 is equal to or smaller than the upper limit UL ("NO" in S1), the addition angle limiter 24 further compares the addition angle $\alpha$ with the lower limit LL (S3). When the addition angle $\alpha$ is smaller than the lower limit LL ("YES" in S3), the lower limit LL is substituted for the addition angle $\alpha$ (S4). Thus, the lower limit LL (=$-\omega$max) is added to the control angle $\theta C$.

When the addition angle $\alpha$ is equal to or larger than the lower limit LL and equal to or smaller than the upper limit UL ("NO" in S3), the addition angle $\alpha$ is added to the control angle $\theta C$ without correction. Therefore, the addition angle limiter 24 limits the addition angle $\alpha$ within the range between the upper limit UL and the lower limit LL so as to stabilize the control. More specifically, although the control state is unstable (assist force is unstable) when the electric current is small or when the control starts, the addition angle limiter 24 encourage the control to move to the stable state.

Figure 8:
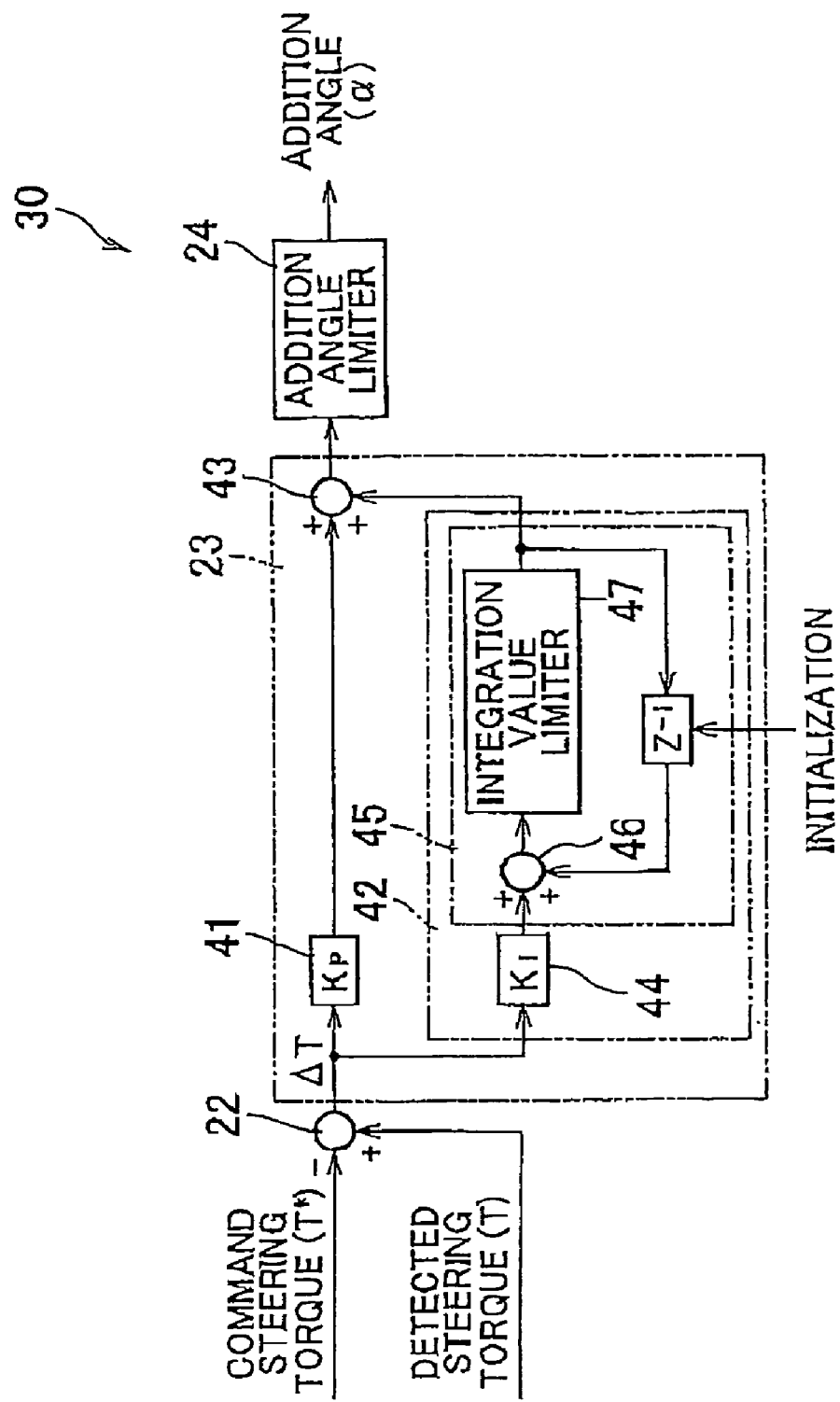
FIG. 8 is a block diagram illustrating an example of the concrete configuration of an addition angle calculation unit.

FIG. 8 is a block diagram illustrating an example of the concrete configuration of the position PI control unit 23. The position PI control unit 23 includes a proportional term calculation unit 41, an integral term calculation unit 42, and an addition unit 43. The proportional term calculation unit 41 is formed of a multiplier that multiplies the torque deviation $\Delta T$ calculated by the torque deviation calculation unit 22 by the proportional gain KP. The integral term calculation unit 42 includes a multiplier 44 and an integrator 45. The multiplier 44 multiplies the torque deviation $\Delta T$ by the integral gain KI. The integrator 45 includes an addition unit 46 that adds the calculation value KI×$\Delta T$ obtained by the multiplier 44 in the present calculation cycle to the integral term $\Sigma(n-1)$ in the immediately preceding calculation cycle ("Z-1" in the drawings indicates the value in the immediately preceding calculation cycle (immediately preceding value)). The value output from the addition unit 46 is limited to a value within the range between the predetermined upper limit and the predetermined lower limit by an integration value limiter 47. The value that has undergone the limitation process executed by the integration value limiter 47 is used as the integral term $\Sigma(n)$ in the present calculation cycle. The integral term $\Sigma(n)$ and the proportional term KP×$\Delta T$ obtained by the proportional term calculation unit 41 are added together by the addition unit 43. The result of this addition is the addition angle $\alpha$. The addition angle $\alpha$ undergoes the limitation process executed by the addition angle limiter 24.

Upon reception of the information that an abnormality has occurred from the abnormality monitoring unit 25, the initialization unit 27 resets the immediately preceding value $\Sigma(n-1)$ of the integral term $\Sigma$ to 0. Thus, the absolute value of the integral term $\Sigma$ becomes a small value. Therefore, the appropriate addition angle $\alpha$ is easily obtained.

Figure 9:
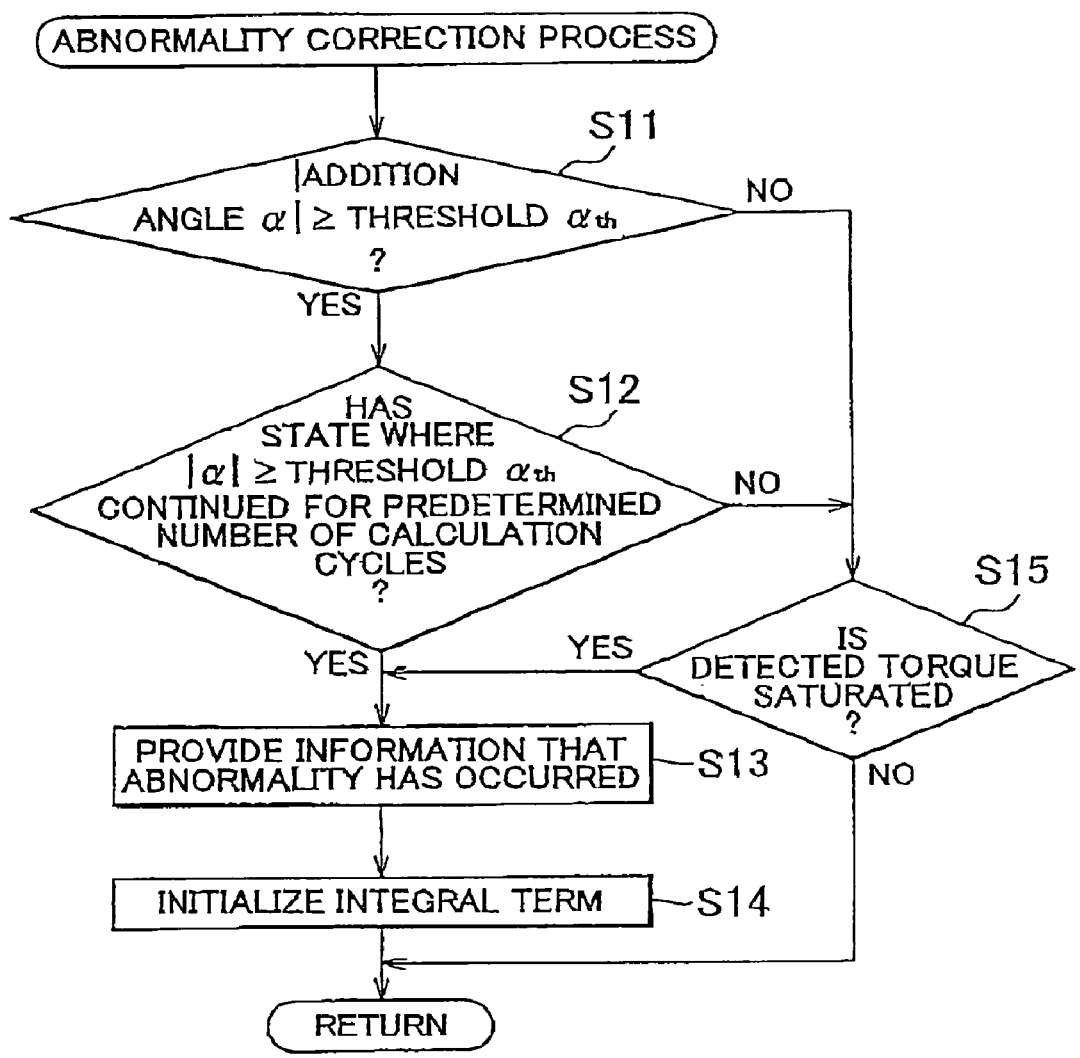
FIG. 9 is a flowchart for describing a process pertaining to an abnormality in a control.

FIG. 9 is a flowchart for describing the process executed by the abnormality monitoring unit 25 and the initialization unit 27. The abnormality monitoring unit 25 compares the absolute value of the addition angle $\alpha$ obtained by the position PI control unit 23 with the threshold $\alpha$th (S11). When the absolute value of the addition angle $\alpha$ is equal to or larger than the threshold $\alpha$th ("YES" in S11), the abnormality monitoring unit 25 determines whether the state where the absolute value of the addition angle $\alpha$ is equal to or larger than the threshold $\alpha$th ($|\alpha|\geq\alpha$th) has continued for a predetermined number of calculation cycles (S12). If an affirmative determination is made, it is determined that an abnormality has occurred in the control, and the abnormality monitoring unit 25 provides the initialization unit 27 with the information that an abnormality has occurred (S13). Upon reception of this information, the initialization unit 27 resets (initializes) the immediately preceding value $\Sigma(n-1)$ of the integral term $\Sigma$ in the position PI control unit 23 to 0 (S14).

If a negative determination is made in S11 or in S12, the abnormality monitoring unit 25 determines whether the detected steering torque T is saturated (S15). If an affirmative determination is made, it is determined that an abnormality has occurred in the control, and the abnormality monitoring unit 25 provides the initialization unit 27 with the information that an abnormality has occurred (S13). Upon reception of this information, the initialization unit 27 resets (initializes) the immediately preceding value $\Sigma(n-1)$ of the integral term $\Sigma$ in the position PI control unit 23 to 0 (S14).

When it is determined in S15 that the detected steering torque T is not saturated, it is determined that an abnormality has not occurred in the control. In this case, the integral term $\Sigma$ is not initialized.

The threshold $\alpha$th is preferably a value equal to or smaller than the predetermined limit $\omega$max. For example, the threshold $\alpha$th may be a value equal to the limit $\omega$max.

The state where the absolute value of the addition angle $\alpha$ is equal to or larger than the threshold $\alpha$th has continued signifies the state where the addition angle $\alpha$ is subjected to the limitation process executed by the addition angle limiter 24 has continued. In this case, the control angle $\theta$C is changed by the limit $\omega$max at every calculation cycle. Therefore, the control angle $\theta$C is changed by a large amount. The state where the detected steering torque T is saturated signifies the state where the magnitude of a steering torque that is applied to the steering wheel 10 by the driver is high. That is, the system is not able to properly respond to the command steering torque T*, and an abnormality has occurred in the control or there is a sign of abnormality in the control. At this time, the absolute value of the torque deviation $\Delta$T is a large value, and therefore the absolute value of the addition angle $\alpha$ is a large value. Accordingly, it is considered that the absolute value of the addition angle $\alpha$ calculated by the position PI control unit 23 (the addition angle $\alpha$ that has not undergone the limitation process executed by the addition angle limiter 24) exceeds the limit $\omega$max.

In the states described above, because the absolute value of the addition angle $\alpha$ is limited by the limit $\omega$max, the control angle $\theta$C is changed by the limit $\omega$max at every calculation cycle. Accordingly, the amount of change in the control angle $\theta$C is large. Therefore, the control angle $\theta$C changes so as to cross the appropriate value, and it takes a long time to bring the control angle $\theta$C to the appropriate value. Therefore, recovery from the abnormality in the control is delayed. In addition, because the control angle $\theta$C is changed by the predetermined limit $\omega$max at every calculation cycle, the control angle $\theta$C cyclically takes a finite number of values. Especially, when the limit $\omega$max is set to a divisor of 360 degrees, for example, 45 degrees, the control angle $\theta$C is cyclically changed by the amount equal to the limit $\omega$max. Accordingly, it is more difficult to bring the control angle $\theta$C to the appropriate value.

Therefore, in the first embodiment, when the state where the absolute value of the addition angle $\alpha$ is equal to or larger than the threshold $\alpha$th has continued, or when saturation of the detected steering torque T is detected, it is determined that an abnormality has occurred in the control. When it is determined that an abnormality has occurred in the control, the initialization unit 27 initializes the integral term $\Sigma$ of the position PI control unit 23, in the first embodiment. Thus, with the motor control unit according to the first embodiment, it is possible to promote recovery from the abnormal state,
and the control angle, $\theta$C is more easily brought to the appropriate value. Especially, immediately after initialization of the integral term $\Sigma$, the position PI control unit 23 is able to promptly output the integral term KI×$\Delta$T that is proportional to the torque deviation $\Delta$T. Therefore, the position PI control unit 23 is able to prepare the appropriate addition angle $\alpha$ that reflects the torque deviation $\Delta$T from immediately after the initialization of the integral term $\Sigma$. Thus, with the motor control unit according to the first embodiment, the state where a steering assist force is unstable promptly ends. Therefore, it is possible to improve a steering feel.

Figure 10:
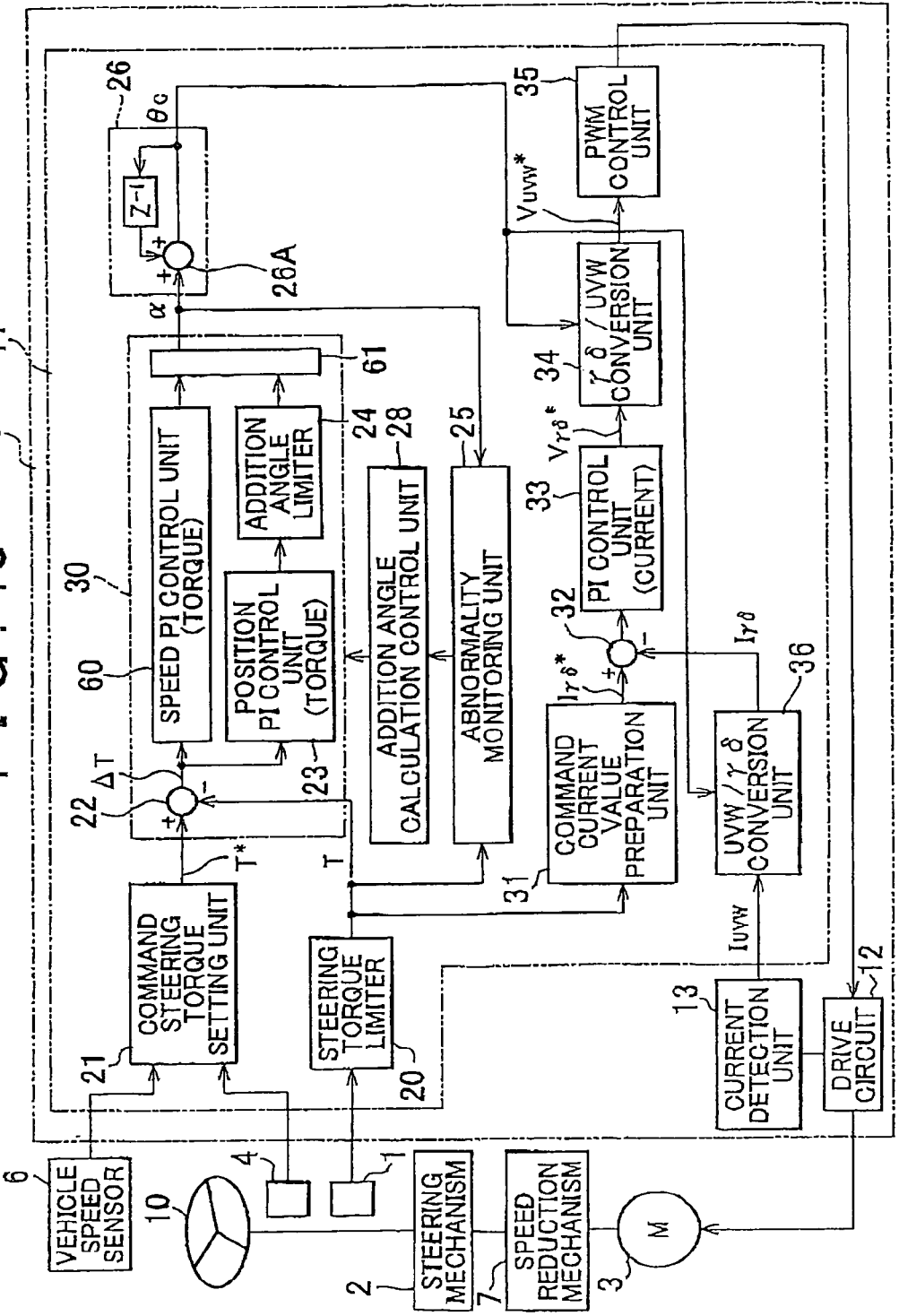
FIG. 10 is a block diagram illustrating the electrical configuration of an electric power steering apparatus that includes a motor control unit according to a second embodiment of the invention.

FIG. 10 is a block diagram illustrating the electrical configuration of an electric power steering apparatus that includes a motor control unit according to a second embodiment of the invention. The portions in FIG. 10, which correspond to those in FIG. 1, are denoted by the same reference numerals as those in FIG. 1.

In the second embodiment, the addition angle calculation unit 30 includes the torque deviation calculation unit 22, the position PI control unit 23, the addition angle limiter 24, a speed PI control unit 60, and a switching unit 61. Also, as a function processing unit of the microcomputer 11, there is provided an addition angle calculation control unit 28 that controls the addition angle calculation unit 30 based on the result of determination as to whether an abnormality has occurred, which is made by the abnormality monitoring unit 25. The addition angle calculation control unit 28 controls the switching unit 61 so as to enable one of the speed PI control unit 60 and the position PI control unit 23 and disable the other of the speed PI control unit 60 and the position PI control unit 23. The addition angle calculation control unit 28 executes processes such as initialization of the integral term in the position PI control unit 23 and setting of the initial value in the speed PI control unit 60 when necessary.

Figure 11:
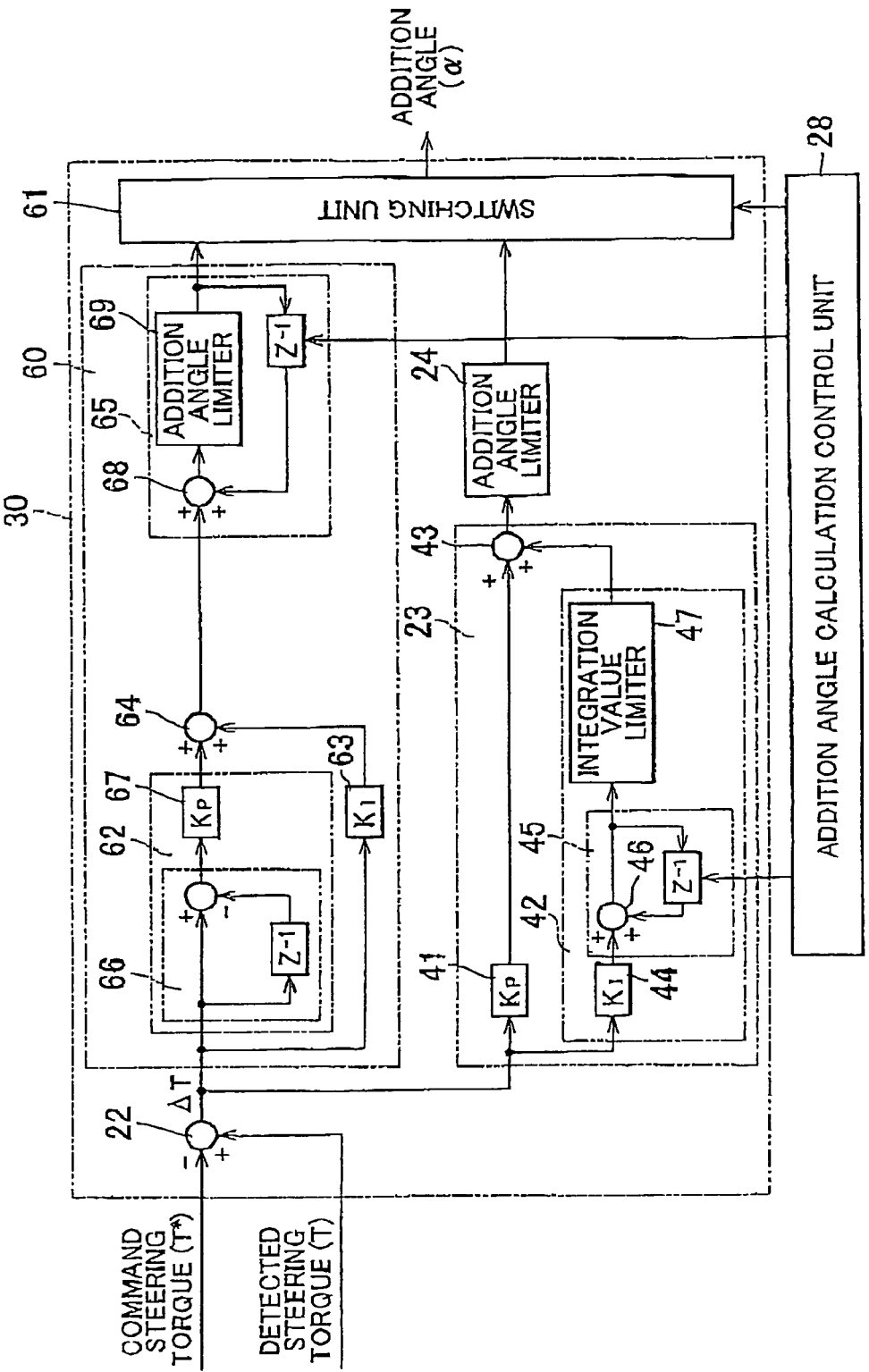
FIG. 11 is a block diagram illustrating an example of the concrete configuration of an addition angle calculation unit.

FIG. 11 is a block diagram illustrating an example of the concrete configuration of the addition angle calculation unit 30. Because the configuration of the position PI control unit 23 is the same as that in the first embodiment, the portions in FIG. 11, which correspond to those in FIG. 8, will be denoted by the same reference numerals as those in FIG. 8. Note that, in the configuration in FIG. 11, the integration value limiter 47 imposes limits on the integration value $\Sigma(n)$ in the present calculation cycle.

The speed PI control unit 60 includes a proportional element calculation unit 62, an integral element calculation unit 63, an addition unit 64, and an integration processing unit 65. The proportional element calculation unit 62 includes a torque deviation change amount calculation unit 66 that obtains the difference (amount of change) between the torque deviation $\Delta$T(n) in the present calculation cycle and the torque deviation $\Delta$T(n-1) in the immediately preceding calculation cycle, and a multiplier 67 that multiplies the obtained the amount of change in the torque deviation by the proportional gain KP. The value output from the multiplier 67 is the proportional element KP×{$\Delta$T(n)-$\Delta$T(n-1)}. The integral element calculation unit 63 is formed of a multiplier that obtains the integral element KI×$\Delta$T(n) by multiplying the torque deviation $\Delta$T(n) in the present calculation cycle by the integral gain KI. The addition unit 64 adds proportional element KP×{$\Delta$T(n)-$\Delta$T(n-1)} and the integral element KI×$\Delta$T(n) together. The integration processing unit 65 executes the integration process on the result of addition executed by the addition unit 64. The integration processing unit 65 includes an addition unit 68 that obtains the addition angle $\alpha$(n) in the present calculation cycle by adding the value output from the addition unit 64 to the addition angle $\alpha$(n-1) in the immediately preceding calculation cycle.

In the second embodiment, an addition angle limiter 69 that limits the addition angle α with the use of the limit ωmax is incorporated in the integration processing unit 65. The function of the addition angle limiter 69 is the same as that of the addition angle limiter 24. Note that, the addition angle limiter 69 functions also as an integration value limiter that prevents the absolute value of the integration value in integration processing unit 65 from being excessive.

The integration processing unit 65 integrates the value output from the addition unit 64 for multiple calculation cycles. The torque deviation change amount is integrated by integrating the proportional element for multiple calculation cycles. Therefore, the value corresponding to the proportional term obtained by multiplying the torque deviation ($\Sigma\{\Delta T(n)-\Delta T(n-1)\}$) by the proportional gain KP is determined. In addition, the integral term ($\Sigma KI \times \Delta T$) is determined by integrating the integral element $KI \times \Delta T(n)$ for multiple calculation cycles. The value output from the integration processing unit 65 corresponds to the value obtained by adding the proportional term and the integral term together (proportional term+integral term). Therefore, the calculation result that is the same as the calculation result obtained by the position PI calculation is obtained by executing the calculation for multiple calculation cycles.

The advantages of the speed PI calculation are that the addition angle limiter 69 serves also as the integration value limiter and that it is possible to easily add, when necessary, the guard process or another process. In the guard process, an abrupt change in the addition angle α is suppressed by limiting the absolute value of the amount of change in the addition angle between the calculation cycles (output from the addition unit 64: $KP \times \{\Delta T(n)-\Delta T(n-1)\}+KI \times \Delta T(n)$) to a value equal to or smaller than the predetermined value. On the other hand, the disadvantage of the speed PI calculation is that because the proportional element is not sufficiently integrated before the calculation is executed for a sufficient number of calculation cycles, it is difficult to obtain the appropriate calculation value (addition angle α) that reflects the torque deviation ΔT in a period immediately after the calculation is started.

The switching unit 61 provides the control angle calculation unit 26 with one of the addition angle α that is obtained by the position PI control unit 23 and then subjected to the process executed by the addition angle limiter 24 and the addition angle α that is obtained by the speed PI control unit 60.

The addition angle calculation control unit 28 controls the switching unit 61 in such a manner that the addition angle α that is obtained by the speed PI control unit 60 is selected in the normal state where the addition angle α is not abnormal and the addition angle α that is obtained by the position PI control unit 23 is selected when the addition angle α is abnormal. When the PI control unit is switched from the speed PI control unit 60 to the position PI control unit 23, the addition angle calculation control unit 28 initializes the integral term of the position PI control unit 23 (resets the integral term of the position PI control unit 23 to 0). In addition, when the PI control unit is switched from the position PI control unit 23 to the speed PI control unit 60, the addition angle calculation control unit 28 sets the addition angle α that is calculated by the position PI control unit 23 and then subjected to the process executed by the addition angle limiter 24 (that is, the present addition angle α) as the immediately preceding value α(n-I) in the integration processing unit 65.

Figure 12:
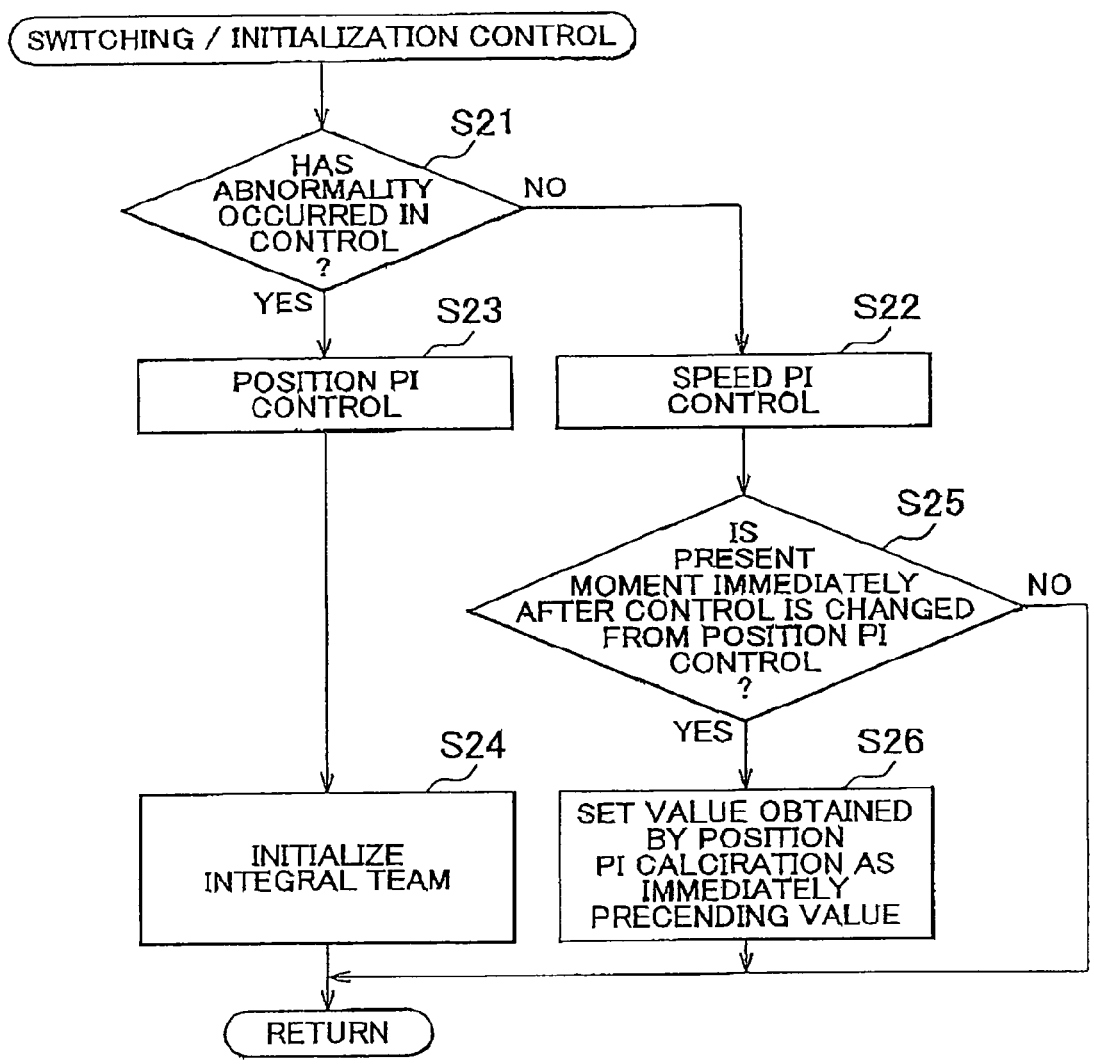
FIG. 12 is a flowchart for describing a process pertaining to an abnormality in a control.

FIG. 12 is a flowchart for describing the operations of the abnormality monitoring unit 25, the addition angle calculation control unit 28 and the addition angle calculation unit 30.

The abnormality monitoring unit 25 determines whether an abnormality has occurred in the control (S21). The operation of the abnormality monitoring unit 25 is the same as that in the first embodiment. For example, the processes in S11 to S13 and S15 are executed.

In the normal state where it is determined that an abnormality has not occurred in the control ("NO" in S21), the addition angle calculation control unit 28 controls the switching unit 61 in such a manner that the addition angle α that is calculated by the speed PI control unit 60 is selected (S22). When the abnormality monitoring unit 25 determines that the addition angle α is abnormal ("YES" in S21), the addition angle calculation control unit 28 controls the switching unit 61 in such a manner that the addition angle α calculated by the position PI control unit 23, etc. is selected (S23), and the integral term of the position PI control unit 23 is initialized (reset to 0) (S24).

Therefore, when an abnormality has occurred, calculation of the addition angle α is switched from the speed PI calculation to the position PI calculation, and the integral term in the position PI calculation is reset to 0. Therefore, after this, the addition angle α is obtained by the position PI calculation. When the position PI control is executed, the proportional term that reflects the entirety of the torque deviation ΔT in the calculation cycle is obtained at every calculation cycle. Therefore, from immediately after initialization of the integral term, the position PI control unit 23 is able to prepare the appropriate addition angle α corresponding to the torque deviation ΔT.

When the value calculated by the speed PI control unit 60 is selected (S22), the addition angle calculation control unit 28 determines whether the present moment is immediately after the PI control is switched from the position PI control (S25). When it is determined that the present moment is immediately after the PI control is switched from the position PI control ("YES" in S25), the addition angle calculation control unit 28 sets the addition angle α that is obtained immediately before by the functions of the position PI control unit 23 and the addition angle limiter 24 as the immediately preceding value α(n-1) of the addition angle α, in the integration processing unit 65 (S26). Thus, the speed PI control unit 60 is able to prepare the appropriate addition angle α from immediately after the control is switched from the position PI control. When it is determined that the present moment is not immediately after the control is switched from the position PI control ("NO" in S25), S26 is omitted.

According to the second embodiment described above, in the normal state, the addition angle α is obtained by the speed PI calculation that has high flexibility. On the other hand, in the abnormal state, the calculation of the addition angle α is switched to the position PI calculation and the integral term in the position PI calculation is initialized. Therefore, the appropriate addition angle α that reflects the torque deviation is prepared from immediately after the initialization. Thus, with the motor control unit according to the second embodiment, the abnormal state promptly ends and the control angle θC is brought to the appropriate value. Therefore, it is possible to control the motor 3 appropriately. As a result, it is possible to improve a steering feel.

Figure 13:
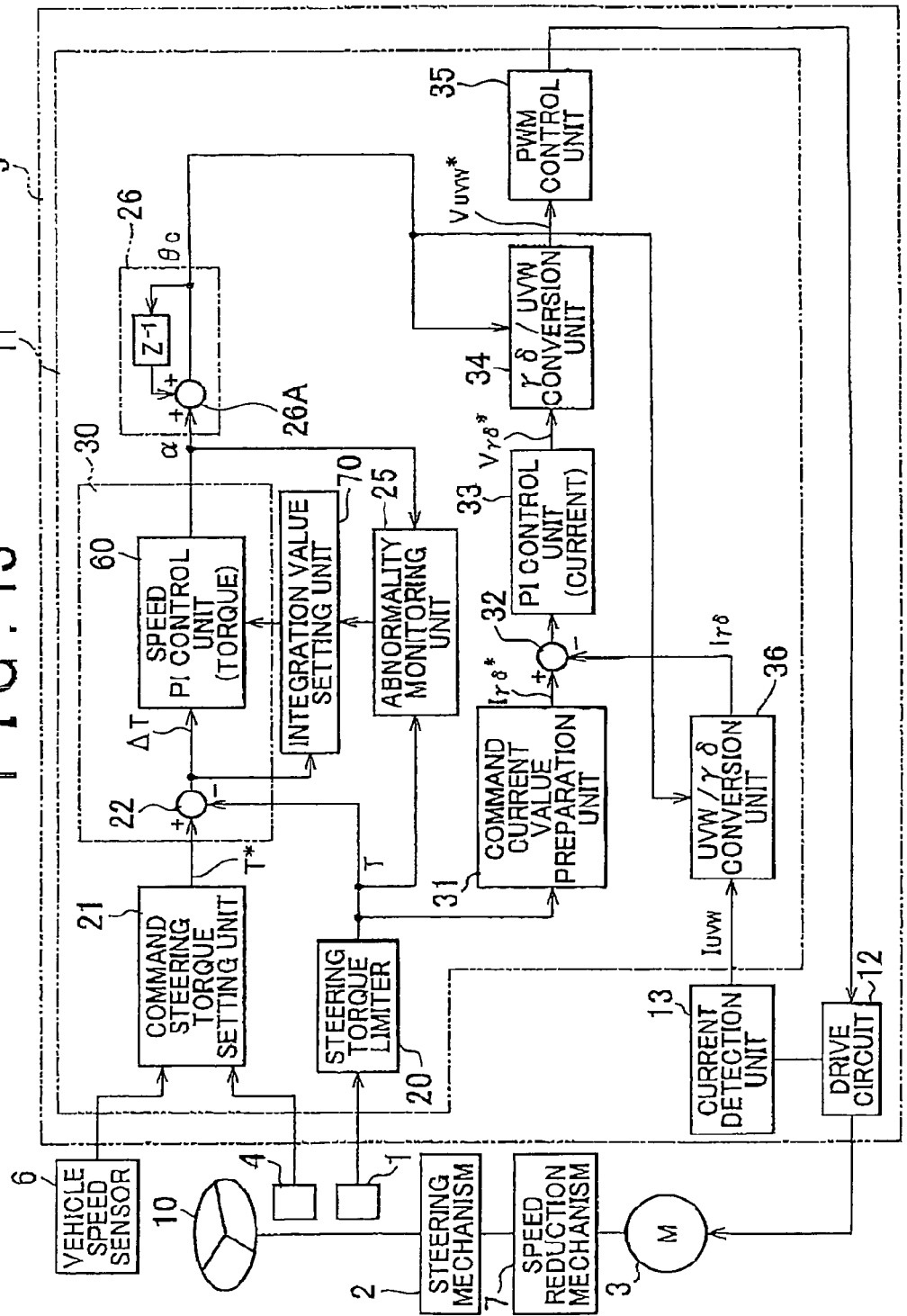
FIG. 13 is a block diagram illustrating the electrical configuration of an electric power steering apparatus that includes a motor control unit according to a third embodiment of the invention.

FIG. 13 is a block diagram illustrating the electrical configuration of an electric power steering apparatus that includes a motor control unit according to a third embodiment of the invention. The portions in FIG. 13, which correspond to those in FIG. 10, are denoted by the same reference numerals as those in FIG. 10.

In the third embodiment, the addition angle calculation unit 30 includes the torque deviation calculation unit 22 and the speed PI control unit 60, and does not include the position PI control unit 23 and the addition angle limiter 24. That is, only the speed PI calculation is used to calculate the addition angle α. In addition, as a function processing unit of the microcomputer 11, there is provided an integration value setting unit 70 that sets the immediately preceding value α(n−1) of the addition angle α to the appropriate value when the addition angle α is abnormal.

Figure 14:
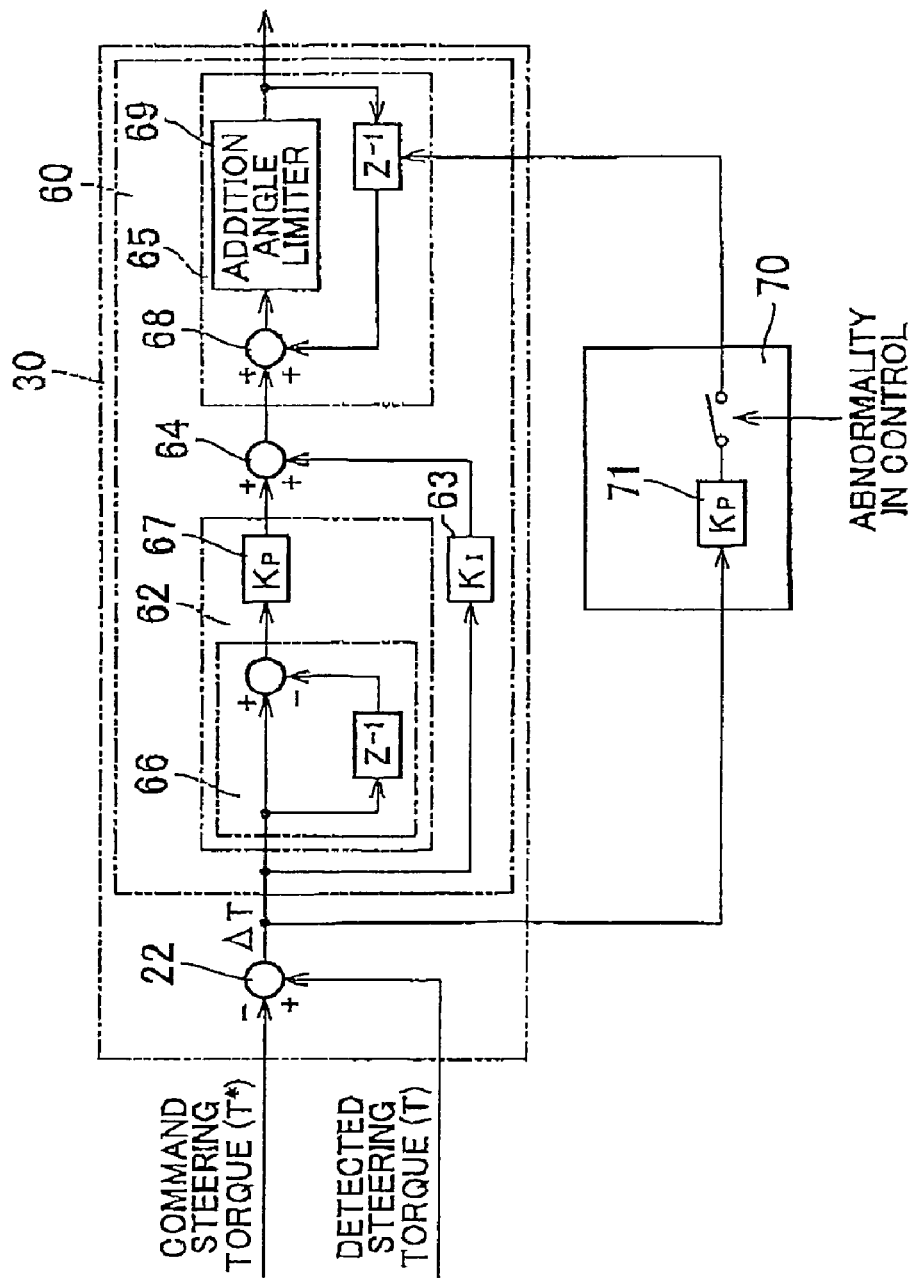
FIG. 14 is a block diagram illustrating an example of the concrete configuration of an addition angle calculation unit, etc.

FIG. 14 is a block diagram illustrating the more detailed configuration of the addition angle calculation unit 30, etc. The portions in FIG. 14, which correspond to those in FIG. 11, are denoted by the same reference numerals as those in FIG. 11.

The integration value setting unit 70 includes a multiplier 71 that multiplies the torque deviation ΔT obtained by the torque deviation calculation unit 22 by the proportional gain KP. In response to the determination that an abnormality has occurred in the control, which is made by the abnormality monitoring unit 25, the integration value setting unit 70 sets the result of calculation executed by the multiplier 71 as the immediately preceding value α(n−1) that is used in the integration processing unit 65. The result of calculation executed by the multiplier 71 is equal to the value when the integral term is reset to 0 in the position PI control. Therefore, when an abnormality has occurred in the control, the same result as that when the control is switched to the position PI control and the integral term is initialized can be obtained by the above-described operation by the integration value setting unit 70. In addition, the position PI control unit need not be provided. Therefore, it is possible to simplify the calculation process executed by the microcomputer 11. Therefore, the calculation load is reduced.

Figure 15:
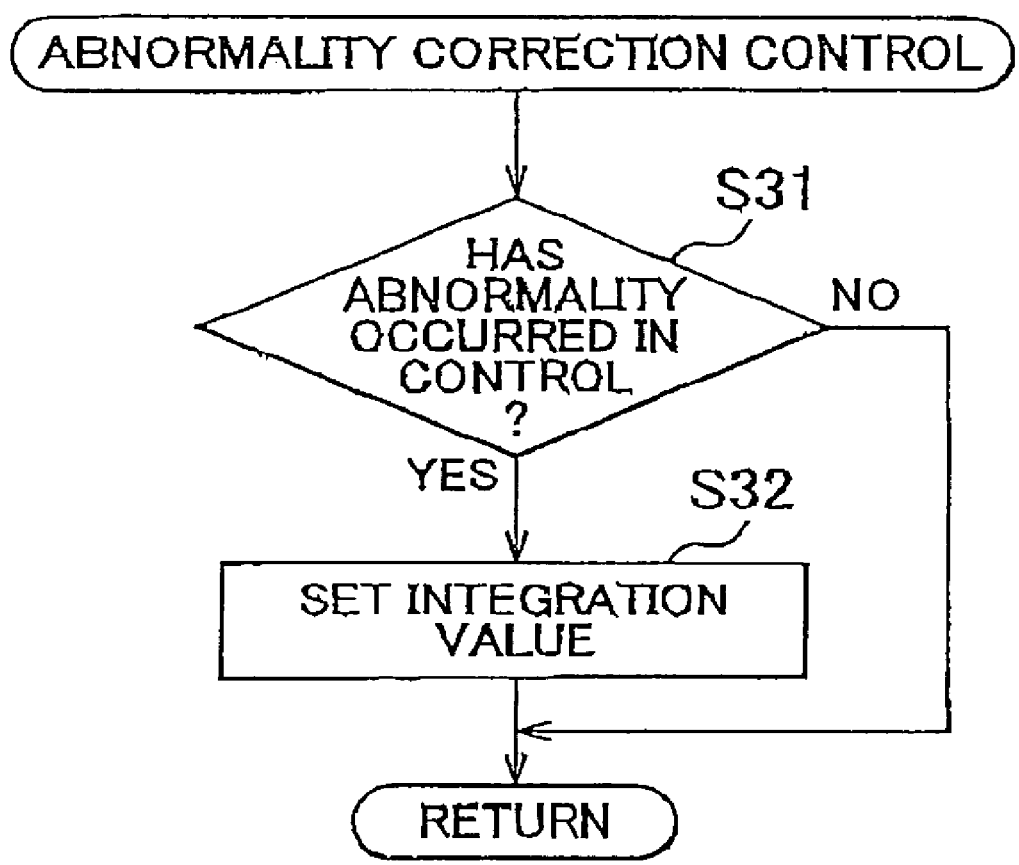
FIG. 15 is a flowchart for describing a process that is executed when an abnormality in a control has occurred.

FIG. 15 is a flowchart for describing the process according to the third embodiment. The abnormality monitoring unit 25 determines whether an abnormality has occurred in the control (S31). When it is determined that an abnormality has occurred in the control ("YES" in S31), the value calculated by the integration value setting unit 70 is set as the immediately preceding value α(n−1) used in the integration processing unit 65 (S32). When an abnormality has not occurred in the control ("NO" in S31), the addition angle α obtained in the immediately preceding calculation cycle is used without correction, as the immediately preceding value α(n−1).

Each embodiment described above relates to the motor control unit 5 used to control the motor 3 that includes the rotor 50 and the stator 55 that faces the rotor 50. The current drive units 31 to 36 drive the motor 3 at the axis current value Iγ* of the rotating coordinate system that rotates in accordance with the control angle θC that is the rotational angle used in the control. The control angle calculation unit 26 obtains the present value of the control angle θC by adding the addition angle α to the immediately preceding value of the control angle θC at every predetermined calculation cycle. The torque detection unit 1 detects the torque T that is other than the motor torque and that is applied to the drive target 2 that is driven by the motor 3. The command torque setting unit 21 sets the command torque T* that should be, applied to the drive target 2. The addition angle calculation unit 30 calculates the addition angle α that should be added to the control angle θC through the proportional-integral control based on the torque deviation ΔT of the detected torque T that is detected by the torque detection unit 1 from the command torque T* that is set by the command torque setting unit 21.

With this configuration, the addition angle α is added to the control angle θC at every calculation cycle to update the control angle θC while the motor 3 is driven at the axis current value (imaginary axis current value) Iγ* of the rotating coordinate system that rotates in accordance with the control angle θC (γδ coordinate system: imaginary rotating coordinate system). Thus, it is possible to generate a required torque by driving the motor 3 at the imaginary axis current value Iγ* while updating the control angle θC, that is, while updating the coordinate axis (imaginary axis) of the imaginary rotating coordinate system. Thus, it is possible to generate an appropriate torque from the motor 3 without using a rotational angle sensor.

In the embodiments, while the command torque (command value for the torque other than the motor torque) T* that should be applied to the drive target 2 is set by the command torque setting unit 21, the torque T that is other than the motor torque and that is applied to the drive target 2 is detected by the torque detection unit 1. The addition angle α is calculated through the proportional-integral control based on the deviation (torque deviation) ΔT of the detected torque T from the command torque T*. That is, there is provided a feedback control unit that calculates the addition angle α so that the detected torque T approaches the command torque T*. Thus, it is possible to appropriately control the control angle θC. As a result, it is possible to generate a motor torque corresponding to the command torque T* from the motor 3.

In the first embodiment, the addition angle calculation unit 30 includes the position proportional-integral calculation unit 23 that has the proportional term calculation unit 41, the integral term calculation unit 42, and the addition unit 43. The proportional term calculation unit 41 obtains the proportional term by multiplying the torque deviation ΔT by the proportional gain. The integral term calculation unit 42 multiplies the torque deviation ΔT by the integral gain and integrates the value obtained through the multiplication for multiple calculation cycles, thereby obtaining the integral term. The addition unit 43 adds the proportional term and the integral term together. The motor control unit further includes the abnormality monitoring unit 25 that determines whether an abnormality has occurred in the control, and the initialization unit 27 that initializes the integral term in the abnormal state where the abnormality monitoring unit 25 determines that an abnormality has occurred in the control.

With this configuration, the addition angle α is obtained through the position proportional-integral control. When an abnormality has occurred in the control, the appropriate addition angle α is promptly obtained by initializing the integral term. That is, if the integral term is reset to, for example, 0, the addition angle α is brought to a value corresponding to the present torque deviation ΔT, and the influence of the integral term that reflects the past control abnormality state (accumulated value of the past torque deviation ΔT) is eliminated. Thus, it is possible to promote prompt recovery from the control abnormal state where the addition angle α is abnormal.

In the second embodiment, the addition angle calculation unit 30 includes the position proportional-integral calculation unit 23 that has the proportional term calculation unit 41, the integral term calculation unit 42, and the addition unit 43. The addition angle calculation unit 30 further includes the speed proportional-integral calculation unit 60 that includes the proportional element calculation unit 62, the integral element calculation unit 63, and the integration processing unit 65. The proportional term calculation unit 41 obtains the proportional term by multiplying the torque deviation ΔT by the proportional gain. The integral term calculation unit 42 obtains the integral term by multiplying the torque deviation ΔT by the integral gain and then integrating the value obtained by multiplication for multiple calculation cycles. The addition unit 43 adds the proportional term and the integral term together. The proportional element calculation unit 62 obtains the proportional element by multiplying the amount of change in the torque deviation $\Delta T$ between the calculation cycles by the proportional gain. The integral element calculation unit 63 obtains the integral element by multiplying the torque deviation $\Delta T$ by the integral gain. The addition unit 64 adds the proportional element and the integral element together. The integration processing unit 65 executes the integration calculation for integrating the results of addition executed by the addition unit 64 for multiple calculation cycles. In the normal state where the abnormality monitoring unit 25 determines that an abnormality has not occurred in the control, the calculation control unit 28 enables the speed proportional-integral calculation unit 60. In the abnormal state where the abnormality monitoring unit 25 determines that an abnormality has occurred in the control, the calculation control unit 28 enables the position proportional-integral calculation unit 23.

In this configuration, the addition angle calculation unit 30 includes the position proportional-integral calculation unit 23 and the speed proportional-integral calculation unit 60. In the normal state where an abnormality has not occurred in the control, the addition angle $\alpha$ is calculated by the speed proportional-integral calculation unit 60. On the other hand, when an abnormality has occurred in the control, the integral term of the position proportional-integral calculation unit 23 is initialized, and the calculation is switched to the addition angle calculation executed by the position proportional-integral calculation unit 23.

Because the speed proportional-integral calculation unit 60 is configured to execute the integration calculation after the proportional element and the integral element are added together, the result of integration is used as the addition angle $\alpha$. Therefore, there is provided the integration value limiting unit that prevents the absolute value of the integration calculation value from being excessive. The integration value limiting unit functions also as the addition angle limiting unit 69 that prevents the absolute value of the addition angle $\alpha$ from being excessive. That is, it is possible to incorporate the addition angle limiting function into the proportional-integral calculation. Also, the result of addition of the proportional element and the integral element corresponds to the amount of change in the addition angle $\alpha$ between the calculation cycles. Therefore, it is possible to easily add the process for the amount of change. More specifically, it is possible to easily add, for example, the guard process for suppressing an abrupt change in the addition angle $\alpha$ by limiting the absolute value of the amount of change in the addition angle $\alpha$ between the calculation cycles to a value equal to or smaller than a predetermined value.

The proportional element in the speed, proportional-integral calculation unit 60 is just the value obtained by multiplying the amount of change in the torque deviation $\Delta T$ between the calculation cycles by the proportional gain. The value obtained by integrating the value, obtained by multiplying the amount of change in the torque deviation $\Delta T$ between the calculation cycles by the proportional gain, in the integration processing unit 65 corresponds to the proportional term in the position proportional-integral calculation unit 23. Therefore, if the addition angle $\alpha$ is reset to 0, it is not possible to prepare the addition angle $\alpha$ that reflects the torque deviation $\Delta T$ and only the amount of change in the torque deviation $\Delta T$ between the calculation cycles is reflected in the addition angle $\alpha$ immediately after the addition angle $\alpha$ is reset to 0. That is, in the speed proportional-integral calculation unit 60, the time period after the addition angle $\alpha$ is initialized until the appropriate addition angle $\alpha$ is output is increased.

In contrast, in the position proportional-integral calculation unit 23, the torque deviation $\Delta T$ in the present calculation cycle is reflected in the addition angle $\alpha$ without correction. Therefore, in the position proportional-integral calculation unit 23, if the integral term is reset, it is possible to promptly prepare the addition angle $\alpha$ that reflects the torque deviation $\Delta T$ after the reset of the integral term. However, the position proportional-integral calculation unit 23 has flexibility lower than that of the speed proportional-integral calculation unit 60. Therefore, for example, if the above-described addition angle limiting unit 69 is required, the addition angle limiting unit 69 needs to be provided separately from the proportional-integral calculation unit. In the position proportional-integral calculation unit 23, it is not easy to add, for example, the guard process for the amount of change in the addition angle $\alpha$.

In the second embodiment, in the normal state, the addition angle $\alpha$ is obtained by the speed proportional-integral calculation that has a high flexibility. When an abnormality has occurred in the control, the calculation is switched to the position proportional-integral calculation. Thus, it is possible to prepare the addition angle $\alpha$ immediately after the initialization process. As a result, it is possible to promote prompt recovery from the abnormal state.

In the third embodiment, the addition angle calculation unit 30 includes the speed proportional-integral calculation unit 60 that has the proportional element calculation unit 62, the integral element calculation unit 63, the addition unit 64, and the integration processing unit 65 that executes the integration calculation. The proportional element calculation unit 62 obtains the proportional element by multiplying the amount of change in the torque deviation $\Delta T$ between the calculation cycles by the proportional gain. The integral element calculation unit 63 obtains the integral element by multiplying the torque deviation $\Delta T$ by the integral gain. The addition unit 64 adds the proportional element and the integral element together. The integration processing unit 65 executes the integration calculation for integrating the result of addition executed by the addition unit 64 for multiple calculation cycles. There is thither provided the integration value resetting unit 70 the resets the integration value obtained by the integration processing unit 65 to the value that is obtained by multiplying the torque deviation $\Delta T$ by the proportional gain in the abnormal state where the abnormality monitoring unit 25 determines that an abnormality has occurred in the control.

With this configuration, the addition angle $\alpha$ is obtained by the speed proportional-integral calculation unit 60. As described above, the advantage of the speed proportional-integral calculation is its high flexibility. The disadvantage of the speed proportional-integral calculation is that it is not possible to reflect the torque deviation $\Delta T$ in the addition angle $\alpha$ promptly after initialization. Therefore, according to the third embodiment, when an abnormality has occurred in the control, the integration value obtained by the integration processing unit 65 is reset to the value that is obtained by multiplying the torque deviation $\Delta T$ by the proportional gain. In other words, when the addition angle $\alpha$ is obtained by the position proportional-integral calculation, the integration value obtained by the integration processing unit 65 is reset to the value that is output immediately after initialization. Therefore, even when the speed proportional-integral calculation that has high flexibility is employed, it is possible to prepare the addition angle $\alpha$ that reflects the torque deviation $\Delta T$ from immediately after the reset due to occurrence of an abnormality in the control. Thus, it is possible to promptly recover from the state where the addition angle $\alpha$ is abnormal.

In addition, in the third embodiment, because the position proportional-integral calculation is not required, the calculation load is reduced.

The abnormality monitoring unit 25 includes addition angle monitoring units S11 and S12 that determine that an abnormality has occurred in the control when the consecutive number of times that the absolute value of the addition angle α is equal to or larger than the threshold αth reaches a predetermined number of times. With this configuration, when the consecutive number of times that the absolute value of the addition angle α is equal to or larger than the threshold αth reaches the predetermined number of times, it is determined that an abnormality has occurred in the control. When the state where the absolute value of the addition angle α is large has continued for a long time, it is determined that an abnormal state has occurred in which the control angle θC continuously fluctuates by a large amount and it is not possible to bring the control angle θC to the appropriate value. The predetermined number of times may be determined based on the longest time period (longest assumable time period in the normal state) in which the absolute value of the addition angle α may be continuously equal to or larger than the threshold αth and the calculation cycle.

The abnormality monitoring unit 25 includes a torque monitoring unit S15 that determines that an abnormality has occurred in the control when the torque T detected by the torque detection unit 1 is saturated. More specifically, saturation of the detected torque T signifies the state where the absolute value of the detected torque T is equal to or higher than the predetermined upper limit Tmax. The upper limit Tmax in this case may be determined based on the specifications of the torque detection unit 1. That is, the upper limit Tmax may be set based on the limits of the output signal range in which the signal output from the torque detection unit 1 is reliable. When there is a possibility that the detected torque T is saturated and the control becomes unstable, the torque monitoring unit S15 may determine that an abnormality has occurred.

The addition angle calculation unit 30 further includes the addition angle limiting units 24 and 69 that limit the absolute value of the addition angle α that is added to the immediately preceding value of the control angle θC with the use of the predetermined limit ωmax. As described above, the addition angle limiting units 24 and 69 may be incorporated into the speed proportional-integral calculation unit 60. When the addition angle α is obtained by the position proportional-integral calculation unit 23, the limitation process is executed on the output (addition angle α) from the position proportional-integral calculation unit 23.

It is possible to prevent the addition angle α having the absolute value, which is excessively large with respect to the actual rotation of the rotor 50, from being added to the control angle θC, by imposing appropriate limitations on the addition angle α.

For example, when the axis-current value Iγ* is low with respect to the required motor torque, the absolute value of the addition angle α increases and reaches the limit ωmax. In this case, there is a possibility that the control angle θC changes and takes discrete values that are apart from each other by the limit ωmax, and cyclically takes finite number of values. Accordingly, it may be difficult to bring the control angle θC to the appropriate value. Therefore, when the addition angle α is abnormal, for example, when the addition angle α is maintained at the limit ωmax, the abnormality correction control is executed. In the abnormality correction control, for example, the integral term is initialized, the calculation is switched from the speed proportional-integral calculation to the position proportional-integral calculation, or the integration value in the speed proportional-integral calculation is reset. Thus, the motor control is recovered from the abnormal state, and the control angle θC is more promptly brought to the appropriate value.

The limit ωmax may be, for example, a value that is determined according to the following equation. Note that "maximum rotor angular speed" in the following equation is the maximum value of the rotor angular speed in the electrical angle.

$$\text{Limit} = \text{maximum rotor angular speed} \times \text{calculation cycle}$$

For example, when the rotation of the motor is transmitted to the steering shaft of the vehicle steering apparatus via the speed reduction mechanism having a predetermined speed reduction ratio, the maximum rotor angular speed is expressed by the equation, maximum steering angular speed (maximum rotational angular speed of the steering shaft)× speed reduction ratio×of pole pairs. "Number of pole pairs" signifies the number of pole pairs (pair of north pole and south pole) of the rotor.

The motor 3 may apply a drive power to the steering mechanism 2 of the vehicle. In this case, the torque detection unit 1 detects the steering torque T that is applied to the operation member 10 that is operated to steer the vehicle. The command torque setting unit 21 sets the command steering torque T* that is used as the target value of the steering torque T. Then, the addition angle calculation unit 30 may calculate the addition angle α based on the deviation ΔT of the steering torque T that is detected by the torque detection unit 1 from the command steering torque T* that is set by the command torque setting unit 21.

With this configuration, the command steering torque T* is set, and the addition angle α is calculated based on the deviation ΔT of the steering torque (detected value) T from the command steering torque T*. Thus, the addition angle α is set in such a manner that the steering torque T coincides with the command steering torque T*, and the control angle θC corresponding to the addition angle α is set. Therefore, if the command steering torque T* is appropriately set, an appropriate drive power is generated by the motor 3 and applied to the steering mechanism 2. That is, the amount of deviation (load angle θL) of the coordinate axis of the rotating coordinate system (dq coordinate system), which extends in the direction of the magnetic poles of the rotor 50, from the imaginary axis is brought to a value corresponding to the command steering torque T*. As a result, an appropriate torque is generated by the motor 3, and a drive power that reflects the intention of the driver is applied to the steering mechanism 2.

Preferably, the motor control unit further includes the steering angle detection unit 4 that detects the steering angle of the operation member 10, and the command torque setting unit 21 sets the command steering torque T* based on the steering angle that is detected by the steering angle detection unit 4. With this configuration, because the command steering torque T* is set based on the steering angle of the operation member 10, an appropriate torque corresponding to the steering angle is generated by the motor 3. Therefore, it is possible to bring the steering torque T that is applied to the operation member 10 by the driver to a value corresponding to the steering angle. Thus, it is possible to obtain a good steering feel.

The command torque setting unit 21 may set the command steering torque T* based on the vehicle speed that is detected by the vehicle speed detection unit 6 that detects the speed of the vehicle. With this configuration, because the command steering torque T* is set based on the vehicle speed, it is possible to execute a so-called vehicle speed-sensitive control. As a result, it is possible to obtain a good steering feel. For example, as the vehicle speed increases, that is, as speed at which the vehicle travels increases, the command steering torque T* is set to a lower value. Thus, it is possible to obtain a good steering feel.

The three embodiments of the invention have been described above. Note that the invention may be implemented in other embodiments. For example, in the embodiments described above, the abnormality monitoring unit 25 monitors the addition angle α and the detected steering torque T to determine whether an abnormality has occurred in the control. Alternatively, the abnormality monitoring unit 25 may monitor only one of the addition angle α and the detected steering torque T to determine whether an abnormality has occurred in the control.

Also, in the embodiments described above, the configuration in which a rotational angle sensor is not provided and the motor 3 is driven by executing the sensorless control has been described. Alternatively, the configuration in which a rotational angle sensor, for example, a resolver is provided and the above-described sensorless control is executed when the rotational angle sensor malfunctions may be employed. Thus, even if the rotational angle sensor malfunctions, the motor 3 is continuously driven. Therefore, the steering assist operation is continuously executed. In this case, when the rotational angle sensor is used, the δ-axis command current value Iδ* is generated by the command current value preparation unit 31 based on the steering torque and the vehicle speed according to the predetermined assist characteristic.

In the embodiments described above, the invention is applied to the electric power steering apparatus. Alternatively, the invention may be applied to a motor control for an electric pump hydraulic power steering apparatus. Further alternatively, the invention may be implemented in various embodiments other than a power steering apparatus. For example, the invention may be applied to a steer-by-wire (SBW) system, a variable gear ratio (VGR) steering system, and a control over a brushless motor provided in another vehicle steering apparatus. The motor control unit according to the invention may be used in a control not only for the vehicle steering apparatus but also for motors for other use.

In addition, various design change may be made within the scope of the claims.

What is claimed is:

1. A motor control unit that is used to control a motor that includes a rotor and a stator that faces the rotor, comprising:
    a current drive unit that drives the motor at an axis current value of a rotating coordinate system that rotates in accordance with a control angle that is a rotational angle used in a control;
    a control angle calculation unit that obtains, at every predetermined calculation cycle, a present value of the control angle by adding an addition angle to an immediately preceding value of the control angle;
    a torque detection unit that detects a torque that is other than a motor torque and that is applied to a drive target that is driven by the motor;
    a command torque setting unit that sets a command torque that is to be applied to the drive target; and
    an addition angle calculation unit that calculates the addition angle that is to be added to the control angle through a proportional-integral control based on a torque deviation of the torque that is detected by the torque detection unit from the command torque that is set by the command torque setting unit.

2. The motor control unit according to claim 1, wherein:
    the addition angle calculation unit includes a position proportional-integral calculation unit that has a proportional term calculation unit that obtains a proportional term by multiplying the torque deviation by a proportional gain, an integral term calculation unit that obtains an integral term by multiplying the torque deviation by an integral gain and integrating the value, that is obtained by multiplying the torque deviation by the integral gain, for multiple calculation cycles, and an addition unit that adds the proportional term and the integral term together; and
    the motor control unit further comprises
    an abnormality monitoring unit that determines whether an abnormality has occurred in a control, and
    an initialization unit that initializes the integral term in an abnormal state where the abnormality monitoring unit determines that an abnormality has occurred in the control.

3. The motor control unit according to claim 2, wherein the abnormality monitoring unit determines that an abnormality has occurred in the control when a consecutive number of times that an absolute value of the addition angle is equal to or larger than a predetermined threshold reaches a predetermined number of times.

4. The motor control unit according to claim 2, wherein the abnormality monitoring unit determines that an abnormality has occurred in the control when the torque that is detected by the torque detection unit is a predetermined saturation value.

5. The motor control unit according to claim 1, further comprising:
    an abnormality monitoring unit that determines whether an abnormality has occurred in a control,
    wherein the addition angle calculation unit comprises
    a position proportional-integral calculation unit that includes a proportional term calculation unit that obtains a proportional term by multiplying the torque deviation by a proportional gain, an integral term calculation unit that obtains an integral term by multiplying the torque deviation by an integral gain and integrating the value, that is obtained by multiplying the torque deviation by the integral gain, for multiple calculation cycles, and an addition unit that adds the proportional term and the integral term together, and
    a speed proportional-integral calculation unit that includes a proportional element calculation unit that obtains a proportional element by multiplying an amount of change in the torque deviation between the calculation cycles by the proportional gain, an integral element calculation unit that obtains an integral element by multiplying the torque deviation by the integral gain, an addition unit that adds the proportional element and the integral element together, and an integration processing unit that executes an integration calculation for integrating a result of addition executed by the addition unit for multiple calculation cycles, and
    a calculation control unit that enables the speed proportional-integral calculation unit in a normal state where the abnormality monitoring unit determines that an abnormality has not occurred in the control, and that initializes the integral term, and enables the position proportional-integral calculation unit in an abnormal state where the abnormality monitoring unit determines that an abnormality has occurred in the control.

6. The motor control unit according to claim 5, wherein the abnormality monitoring unit determines that an abnormality has occurred in the control when a consecutive number of times that an absolute value of the addition angle is equal to or larger than a predetermined threshold reaches a predetermined number of times.

7. The motor control unit according to claim 5, wherein the abnormality monitoring unit determines that an abnormality has occurred in the control when the torque that is detected by the torque detection unit is a predetermined saturation value.

8. The motor control unit according to claim 1, wherein:
the addition angle calculation unit includes a speed proportional-integral calculation unit that has a proportional element calculation unit that obtains a proportional element by multiplying an amount of change in the torque deviation between the calculation cycles by a proportional gain, an integral element calculation unit that obtains an integral element by multiplying the torque deviation by an integral gain, an addition unit that adds the proportional element and the integral element together, and an integration processing unit that executes an integration calculation for integrating a result of addition executed by the addition unit for multiple calculation cycles; and
the motor control unit further comprises
an abnormality monitoring unit that determines whether an abnormality has occurred in a control, and
an integration value resetting unit that resets an integration value obtained by the integration processing unit to the value obtained by multiplying the torque deviation by the proportional gain in an abnormal state where the abnormality monitoring unit determines that are abnormality has occurred in the control.

9. The motor control unit according to claim 8, wherein the abnormality monitoring unit determines that an abnormality has occurred in the control when a consecutive number of times that an absolute value of the addition angle is equal to or larger than a predetermined threshold reaches a predetermined number of times.

10. The motor control unit according to claim 8, wherein the abnormality monitoring unit determines that an abnormality has occurred in the control when the torque that is detected by the torque detection unit is a predetermined saturation value.

11. A motor control unit for a vehicle steering apparatus that has a motor that includes a rotor and a stator that faces the rotor, and a vehicle steering mechanism to which a drive power is applied by the motor, comprising:
a current drive unit that drives the motor at an axis current value of a rotating coordinate system that rotates in accordance with a control angle that is a rotational angle used in a control;
a control angle calculation unit that obtains, at every predetermined calculation cycle, a present value of the control angle by adding an addition angle to an immediately preceding value of the control angle;
a torque detection unit that detects a steering torque that is applied to an operation member;
a command steering torque setting unit that sets a command steering torque that is to be applied to the operation member; and
an addition angle calculation unit that calculates the addition angle that is to be added to the control angle through a proportional-integral control based on a torque deviation of a detected steering torque that is detected by the torque detection unit from a command steering torque that is set by the command steering torque setting unit.

12. The motor control unit for the vehicle steering apparatus according to claim 11, wherein:
the addition angle calculation unit includes a position proportional-integral calculation unit that has a proportional term calculation unit that obtains a proportional term by multiplying the torque deviation by a proportional gain, an integral term calculation unit that obtains an integral term by multiplying the torque deviation by an integral gain and integrating the value, which is obtained by multiplying the torque deviation by the integral gain, for multiple calculation cycles, and an addition unit that adds the proportional term and the integral term together; and
the motor control unit further comprises
an abnormality monitoring unit that determines whether an abnormality has occurred in a control, and
an initialization unit that initializes the integral term in an abnormal state where the abnormality monitoring unit determines that an abnormality has occurred in the control.

13. The motor control unit for the vehicle steering apparatus according to claim 12, wherein the abnormality monitoring unit determines that an abnormality has occurred in the control when a consecutive number of times that an absolute value of the addition angle is equal to or larger than a predetermined threshold reaches a predetermined number of times.

14. The motor control unit for the vehicle steering apparatus according to claim 12, wherein the abnormality monitoring unit determines that an abnormality has occurred in the control when the torque that is detected by the torque detection unit is a predetermined saturation value.

15. The motor control unit for the vehicle steering apparatus according to claim 11, further comprising:
an abnormality monitoring unit that determines whether an abnormality has occurred in a control,
wherein the addition angle calculation unit comprises
a position proportional-integral calculation unit that includes a proportional term calculation unit that obtains a proportional term by multiplying the torque deviation by a proportional gain, an integral term calculation unit that obtains an integral term by multiplying the torque deviation by an integral gain and integrating the value, which is obtained by multiplying the torque deviation by the integral gain, for multiple calculation cycles, and an addition unit that adds the proportional term and the integral term together, and
a speed proportional-integral calculation unit that includes a proportional element calculation unit that obtains a proportional element by multiplying an amount of change in the torque deviation between the calculation cycles by the proportional gain, an integral element calculation unit that obtains an integral element by multiplying the torque deviation by the integral gain, an addition unit that adds the proportional element and the integral element together, and an integration processing unit that executes an integration calculation for integrating a result of addition executed by the addition unit for multiple calculation cycles, and
a calculation control unit that enables the speed proportional-integral calculation unit in a normal state where the abnormality monitoring unit determines that an abnormality has not occurred in the control, and that initializes the integral term and enables the position proportional-integral calculation unit in an abnormal state where the abnormality monitoring unit determines that an abnormality has occurred in the control.

16. The motor control unit for the vehicle steering apparatus according to claim 15, wherein the abnormality monitoring unit determines that an abnormality has occurred in the control when a consecutive number of times that an absolute value of the addition angle is equal to or larger than a predetermined threshold reaches a predetermined number of times.

17. The motor control unit for the vehicle steering apparatus according to claim 15, wherein the abnormality monitoring unit determines that an abnormality has occurred in the control when the torque that is detected by the torque detection unit is a predetermined saturation value.

18. The motor control unit for the vehicle steering apparatus according to claim 11, wherein:

the addition angle calculation unit includes a speed proportional-integral calculation unit that has a proportional element calculation unit that obtains a proportional element by multiplying an amount of change in the torque deviation between the calculation cycles by a proportional gain, an integral element calculation unit that obtains an integral element by multiplying the torque deviation by an integral gain, an addition unit that adds the proportional element and the integral element together, and an integration processing unit that executes an integration calculation for integrating a result of addition executed by the addition unit for multiple calculation cycles; and the motor control unit further comprises an abnormality monitoring unit that determines whether an abnormality has occurred in a control, and an integration value resetting unit that resets an integration value obtained by the integration processing unit to the value obtained by multiplying the torque deviation by the proportional gain in an abnormal state where the abnormality monitoring unit determines that an abnormality has occurred in the control.

19. The motor control unit for the vehicle steering apparatus according to claim 18, wherein the abnormality monitoring unit determines that an abnormality has occurred in the control when a consecutive number of times that an absolute value of the addition angle is equal to or larger than a predetermined threshold reaches a predetermined number of times.

20. The motor control unit for the vehicle steering apparatus according to claim 18, wherein the abnormality monitoring unit determines that an abnormality has occurred in the control when the torque that is detected by the torque detection unit is a predetermined saturation value.

* * * * *